(12) United States Patent
Hersam et al.

(10) Patent No.: US 10,749,170 B2
(45) Date of Patent: Aug. 18, 2020

(54) GRAPHENE-COATED METAL OXIDE SPINEL CATHODES

(71) Applicants: NORTHWESTERN UNIVERSITY, Evanston, IL (US); UCHICAGO ARGONNE, LLC, Chicago, IL (US)

(72) Inventors: Mark C. Hersam, Wilmette, IL (US); Laila Jaber Ansari, Mountain View, CA (US); Kanan P. Puntambekar, Cupertino, CA (US); Michael M. Thackeray, Naperville, IL (US)

(73) Assignees: NORTHWESTERN UNIVERSITY, Evanston, IL (US); UCHICAGO ARGONNE, LLC, Chicago, IL (US)

( * ) Notice: Subject to any disclaimer, the term of this patent is extended or adjusted under 35 U.S.C. 154(b) by 200 days.

(21) Appl. No.: 15/293,909

(22) Filed: Oct. 14, 2016

(65) Prior Publication Data
US 2017/0110720 A1   Apr. 20, 2017

Related U.S. Application Data

(60) Provisional application No. 62/241,475, filed on Oct. 14, 2015.

(51) Int. Cl.
*H01M 4/36*    (2006.01)
*H01M 4/04*    (2006.01)
(Continued)

(52) U.S. Cl.
CPC ......... *H01M 4/366* (2013.01); *H01M 4/0402* (2013.01); *H01M 4/0426* (2013.01); *H01M 4/0428* (2013.01); *H01M 4/0445* (2013.01); *H01M 4/131* (2013.01); *H01M 4/1391* (2013.01); *H01M 4/505* (2013.01); *H01M 4/525* (2013.01); *H01M 4/628* (2013.01);
(Continued)

(58) Field of Classification Search
CPC .... H01M 4/366; H01M 4/0402; H01M 4/131; H01M 4/1391
See application file for complete search history.

(56) References Cited

U.S. PATENT DOCUMENTS 6,110,442 A * 8/2000 Xia ................... C01G 45/1242
                                                            423/599
2007/0212608 A1    9/2007 Liu
(Continued)

FOREIGN PATENT DOCUMENTS

CN      102263239      11/2011
CN      203746972 U    7/2014
(Continued)

OTHER PUBLICATIONS

Machine translation of JP 2013073846 A.*
(Continued)

*Primary Examiner* — Jonathan G Jelsma
(74) *Attorney, Agent, or Firm* — Quarles & Brady LLP

(57) ABSTRACT

Disclosed herein are graphene-coated lithium manganese oxide spinels cathodes for high-performance batteries Li-ion batteries and methods for making thereof. A single-layer graphene coating is shown to significantly reduce manganese loss in the cathodes while concurrently promoting the formation of a well-defined solid electrolyte interphase layer.

20 Claims, 24 Drawing Sheets

(51) Int. Cl.
*H01M 4/131* (2010.01)
*H01M 4/1391* (2010.01)
*H01M 4/525* (2010.01)
*H01M 10/44* (2006.01)
*H01M 4/505* (2010.01)
*H01M 4/62* (2006.01)
*H01M 10/0525* (2010.01)
*H01M 10/0569* (2010.01)
*H01M 4/02* (2006.01)
*H01M 10/052* (2010.01)

(52) U.S. Cl.
CPC ... *H01M 10/0525* (2013.01); *H01M 10/0569* (2013.01); *H01M 10/446* (2013.01); *H01M 10/052* (2013.01); *H01M 2004/021* (2013.01); *H01M 2004/028* (2013.01); *H01M 2300/0037* (2013.01); *Y02T 10/7011* (2013.01)

(56) References Cited

U.S. PATENT DOCUMENTS

| | | | | |
|---|---|---|---|---|
| 2012/0088151 A1* | 4/2012 | Yamazaki | .............. | B82Y 30/00 429/211 |
| 2012/0244430 A1* | 9/2012 | Yamazaki | .............. | H01M 4/131 429/211 |
| 2013/0095389 A1* | 4/2013 | Bhardwaj | .............. | H01M 4/663 429/322 |
| 2013/0162197 A1* | 6/2013 | Takahashi | .............. | H02J 7/0073 320/107 |
| 2013/0164619 A1* | 6/2013 | Yamakaji | .............. | H01M 4/134 429/217 |
| 2013/0316097 A1 | 11/2013 | Choi et al. | | |
| 2014/0013589 A1* | 1/2014 | Wang | .................... | H01M 4/139 29/623.5 |
| 2014/0103264 A1 | 4/2014 | Liu | | |
| 2014/0315083 A1* | 10/2014 | Liu | ........................ | H01M 4/366 429/217 |
| 2015/0044556 A1* | 2/2015 | Wang | .................... | H01M 4/366 429/213 |

FOREIGN PATENT DOCUMENTS

| | | |
|---|---|---|
| CN | 104466114 | 3/2015 |
| CN | 104485451 | 4/2015 |
| CN | 103384001 | 9/2015 |
| JP | 2013073846 A * | 4/2013 |
| JP | 2014143038 | 8/2014 |
| KR | 2013028423 | 3/2013 |
| KR | 20140091374 A | 7/2014 |
| WO | 2012/174996 | 12/2012 |
| WO | 2014/109619 | 7/2014 |
| WO | WO 2014115669 | 7/2014 |
| WO | WO 2014115670 | 7/2014 |
| WO | WO 2013192258 | 3/2015 |

OTHER PUBLICATIONS

"Olivine—Wikipedia", https://en.wikipedia.org/wiki/Olivine, accessed Aug. 7, 2018.*
Armand, M. et al. Building better batteries. Nature 2008, vol. 451, pp. 652-657.
Baddour-Hadjean, Rita et al. Raman microspectrometry applied to the study of electrode materials from lithium batteries. Chem. Rev. 2010, vol. 110, pp. 1278-1319.
Bai, Ying. et al. Surface modification of spinel LiMn2O4 with Y2O3 for lithium-ion battery. Adv. Mater. Res. 2012, Vols. 391-392, pp. 1069-1074.
Bak, Seong-Min et al. Spinel LiMn2O4—reduced graphene oxide hybrid for high rate lithium ion batteries. Journal of Materials Chemistry (2011), 21(43), 17309-17315.
Becke, Axel D., Density-functional thermochemistry. III. The role of exact exchange, The Journal of Chemical Physics. 1993, vol. 98, pp. 5648-5652.
Benedek, R. et al. Simulation of the surface structure of lithium manganese oxide spinel. Phys. Rev. B 2011, vol. 83, pp. 195439-1195439-8.
Bhattacharya, Jishnu et al. Prediction of quaternary spinel oxides as Li-battery cathodes: Cation site preference, metal mixing, voltage and phase stability. J. Electrochem. Soc. 2014, vol. 161, pp. A1440-A1446.
Blochl, Peter E. et al. Improved tetrahedron method for Brillouin-zone integrations. Phys. Rev. B 1994, vol. 49, pp. 16223-16234.
Bunch, J. Scott et al. Impermeable atomic membranes from graphene sheets. Nano Lett. 2008, vol. 8, pp. 2458-2462.
Chattopadhyay, Sudeshna et al. In situ x-ray study of the solid electrolyte interphase (SEI) formation on graphene as a model Li-ion battery anode. Chem. Mater. 2012, vol. 24, pp. 3038-3043.
Cho, In Haeng. et al. Effect of SEI on capacity losses of spinel lithium manganese oxide/graphite batteries stored at 60 degrees C. Electrochem. Solid-State Lett. 2010, vol. 13, pp. A168-A172.
Cho, Jaephil et al. Enhancement of thermal stability of LiCoO2 by LiMn2O4 coating. Electrochem. Solid-State Lett. 1999, vol. 2, pp. 253-255.
Cui, Yong-Li et al. Synthesis and electrochemical performance of graphene modified nano-spinel LiMn2O4 cathode materials. Wuji Huaxue Xuebao (2013), 29(1), 50-56.
Dudarev, S.L. et al. Electron-energy-loss spectra and the structural stability of nickel oxide: an LSDA+ study. Phys. Rev. B 1998, vol. 57, pp. 1505-1509.
Ferrari, Andrea C., and Basko, Denis M., Raman spectroscopy as a versatile tool for studying the properties of graphene, Nat. Nanotechnol., 2013, vol. 8, pp. 235-246.
Geng, W.T. Formation of perpendicular graphene nanosheets on LiFePO4: A first-principles characterization. Phys. Chem. C 2012, vol. 116, 17650-17656.
Gowda, S.R. et al. Oxidation state of cross-over manganese species on the graphite electrode of lithium-ion cells. Phys. Chem. Chem. Phys. 2014, vol. 16, 6898-6902.
Guan, Dongsheng et al. Enhanced cycleability of LiMn2O4 cathodes by atomic layer deposition of nanosized-thin Al2O3 coatings. Nanoscale 2011, vol. 3, pp. 1465-1469.
Gummow, R.J. et al. Improved capacity retention in rechargeable 4 V lithium/lithium-manganese oxide (spinel) cells. Solid State Ionics 1994, vol. 69, pp. 59-67.
Gummow, R.J. et al. Lithium extraction from orthorhombic lithium manganese oxide and the phase transformation to spinel. Mater. Res. Bull. 1993, vol. 28, pp. 1249-1256.
Jaber-Ansari, L. eta l. Defect evolution in graphene upon electrochemical lithiation. ACS Appl. Mater. Interfaces 2014, vol. 6, pp. 17626-17636.
Karim, Altaf, et al. Surface structure and equilibrium particle shape of the LiMn2O4 spinal from first-principles calculations. Phys. Rev. B. 2013, vol. 87, pp. 075322-1-075322-6.
Kim, Jaekook. et al. A manganese oxyiodide cathode for rechargeable lithium batteries. Nature 1997, vol. 390, pp. 265-267.
Kim, Joo-Seong et al. A truncated manganese spinel cathode for excellent power and lifetime in lithium-ion batteries. Nano Lett. 2012, vol. 12, pp. 6358-6365.
Komaba, S. et al. Preparation of Li-Mn-O thin films by r.f.-sputtering method and its application to rechargeable batteries. J. Appl. Electrochem. 2000, vol. 30, pp. 1179-1182.
Kreese, G. et al. Ab initio molecular dynamics for liquid metals. Phys. Rev. B 1993, vol. 47, pp. 558-561.
Kresse, G. et al. Efficiency of ab-initio total energy calculations for metals and semiconductors using a plane-wave basis set. Comput. Mater. Sci. 1996, vol. 6, pp. 15-50.
Kresse, G. et al. From ultrasoft pseudopotentials to the projector augmented-wave method. Phys. Rev. B 1999, vol. 59, pp. 1758-1775.
Kucinskis, Gints et al. Graphene in lithium ion battery cathode materials: a review. J. Power Sources 2013, vol. 240, pp. 66-79.

(56) References Cited

OTHER PUBLICATIONS

Lee, Chengteh et al. Development of the Colle-Salvetti correlation-energy formula into a functional of the electron density. Phys. Rev. B 1988, vol. 37, pp. 785-789.
Liddle, Brendan J. et al. A new one-pot hydrothermal synthesis and electrochemical characterization of Li1+xMn2-yO4 spinel structured compounds. Energy & Environmental Science, 2010, vol. 3, pp. 1339-1346.
Li, X et al. Large-area synthesis of high-quality and uniform graphene films on copper foils. Science 2009, vol. 324, pp. 1312-1314.
Lung-Hoa, Hu B. et al. Graphene-modified LiFePO4 cathode for lithium ion battery beyond theoretical capacity. Nat. Commun. 2013, vol. 4, 1687, pp. 1-7.
Luo, L. et al. Dynamics of electrochemical lithiation/delithiation of graphene-encapsulated silicon nanoparticles studied by in-situ TEM. Sci. Rep. 2014, vol. 4, 3863, pp. 1-6.
Lu, Y.H. et al. Effects of edge passivation by hydrogen on electronic structure of armchair graphene nanoribbon and band gap engineering. Appl. Phys. Lett. 2009, vol. 94, pp. 122111-1-122111-3.
Monkhorst, Hendrik J. et al. Special points for Brillouin-zone integrations. Phys. Rev. B 1976, vol. 13, pp. 5188-5192.
Mukai, Kazuhiko et al. Pressure dependence of magnetic transition temperature in Li[LixMn2-x]O4 (0<x<1/3) studied by muon-spin rotation and relaxation. J. Power Sources 2013, vol. 224, pp. 230-235.
Myung, Seung-Taek et al. Spherical core-shell Li[(Li0.05Mn0.95)0.8(Ni0.25Mn0.75)0.2]2O4 spinels as high performance cathodes for lithium batteries. Energy Environ. Sci. 2011, vol. 4, pp. 935-939.
Noh, Hyun Kuk et al. Doubling the capacity of lithium manganese oxide spinel by a flexible skinny graphitic layer. Chemie 2014, vol. 53, pp. 5059-5063.
Ouyang, C.Y. et al. Jhan-Teller distortion and electronic structure of LiMn2O4. Alloys Compd. 2009, vol. 474, pp. 370-374.
Ouyang, C.Y. et al. Oxidation states of Mn atoms at clean and Al2O3-covered LiMn2O4(001) surfaces. J. Phys. Chem. C 2010, vol. 114, pp. 4756-4759.
Perdew, John P. et al. Generalized gradient approximation made simple. Phys. Rev. Lett. 1996, 77, 3865.
Regan, E. et al. Surface and Bulk Compositions of Lithium Manganese Oxides. Surf. Interface Anal. 1999, vol. 27, pp. 1064-1068.
Roy, S.S. et al. Improving graphene diffusion barriers via stacking multiple layers and grain size engineering. Adv. Funct. Mater. 2013, vol. 23, pp. 3638-3644.
Russell, John et al. Methane bond activation by Pt and Pd subnanometer clusters supported on graphene and carbon nanotubes. Chem. Phys. Lett. 2012, vol. 536, pp. 9-13.
Sathiya, M. et al. Reversible anionic redox chemistry in high-capacity layered-oxide electrodes. Nat. Mater. 2013, vol. 12, pp. 827-835.
Singh, P. et al. Preparation and characterization of lithium manganese oxide cubic spinel Li1.03Mn1.97O4 doped with Mg and Fe. Phys. B 2010, vol. 405, pp. 649-654.
Suk, J.W. et al. Transfer of CVD-grown monolayer graphene onto arbitrary substrates. ACS Nano 2011, vol. 5, pp. 6916-6924.
Tarascon, J.M. et al. Issues and challenges facing rechargeable lithium batteries. Nature 2001, vol. 414, pp. 359-367.
Thackeray, M.M. et al. Electrochemical extraction of lithium from LiMn2O4. Mater. Res. Bull. 1984, vol. 19, pp. 179-187.
Thackeray, M.M. Manganese oxides for lithium batteries. Prog. Solid State Chem. 1997, vol. 25, pp. 1-71.
Thackeray, M.M. et al. Structural stability of LiMn2O4 electrodes for lithium batteries. J. Power Sources 1997, vol. 68, pp. 153-158.
Thackeray, M.M. et al. Thermal stability of Li4Mn5O12 Electrodes for Lithium Batteries. J. Electrochem. Soc. 1992, vol. 139, pp. 363-366.
Thackeray, M.M. eta 1. ZrO2- and Li2ZrO3-stabilized spinel and layered electrodes for lithium batteries. Electrochem. Commun. 2003, vol. 5, pp. 752-758.
Zhan, C. et al. Mn(II) deposition on anodes and its effects on capacity fade I spinel lithium mangante-carbon systems. Nat. Commun. 2013, vol. 4:2437, pp. 1-8.
Zhuo, H. et al. Improved electrochemical performance of spinel LiMnO4 in situ coated with graphene-like membrane. J. Power Sources 2014, vol. 247, pp. 721-728.
Ge, Qisheng et al. Enhanced cycling stability of spinel LiMn2O4 cathode by incorporating graphene sheets. Russian Journal of Electrochemistry (2015), 51(2), 125-133.
Jaber-Ansari et al. Suppressing Manganese Dissolution from Lithium Manganese Oxide Spinel Cathodes with Single-Layer Graphene. Adv Enengy Mater 2015, 5, 1500646.
Jiang, Rongyan et al. Using graphene nanosheets as a conductive additive to enhance the rate performance of spinel LiMn2O4 cathode material. Physical Chemistry Chemical Physics (2013), 15(17), 6406-6415.
Jo, Kyung-Yeon et al., Remarkable enhancement of the electrode performance of nanocrystalline LiMn2O4 via solvothermally-assisted immobilization on reduced graphene oxide nanosheets, Electrochimica Acta (2013), 92, 188-196.
Ju, Bowei et al. Electrochemical performance of the graphene/Y2O3/LiMn2O4 hybrid as cathode for lithium-ion battery. Journal of Alloys and Compounds (2014), 584, 454-460.
Kumar, Pushpendra et al. High-performance graphene/Sulphur electrodes for flexible Li-ion batteries using the low-temperature spraying method. Nanoscale, 2015, 7(17), pp. 8093-8100.
Liang, Xinghua et al. Enhance electrochemical performance of LiLa0.1Mn1.9O4 by graphene oxide coating for lithium ion battery. Journal of the Indian Chemical Society (2014), 91(11), 2035-2040.
Lin, Binghui et al. LiMn2O4 nanoparticles anchored on graphene nanosheets as high-performance cathode material for lithium-ion batteries. Journal of Solid State Chemistry (2014), 209, 23-28.
Liu, Yisi et al. Spinel LiMn2O4 nanoparticles dispersed on nitrogen-doped reduced graphene oxide nanosheets as an efficient electrocatalyst for aluminum-air battery. International Journal of Hydrogen Energy, 2015, 40(30):9225-9234.
Perdew, John P. et al. Generalized Gradient Approximation Made Simple, Phys. Rev. Lett. 1997, 78, 1396.
Prabakar, S.J. et al. Graphene-sandwiched LiNi0.5Mn1.5O4 cathode composites for enhanced high voltage performance in Li ion batteries. Journal of the Electrochemical Society (2013), 160(6), A832-A837.
Pyun, Min Ho et al. Graphene/LiMn2O4 nanocomposites for enhanced lithium ion batteries with high rate capability. Journal of Alloys and Compounds, 2015. 643, Supplemental 1, S90-S94.
Ragavendran, K. et al. On the graphene incorporated LiMn2O4 nano- structures: possibilities for tuning the preferred orientations and high rate capabilities RSC Advances (2014), 4(104), 60106-60111.
Xu, Huayun et al. Improved electrochemical performance of LiMn2O4/graphene composite as cathode material for lithium ion battery. International Journal of Electrochemical Science (2012), 7(11), 10627-10632.
Zhao, Xin et al. Self-assembled lithium manganese oxide nanoparticles on carbon nanotube or graphene as high-performance cathode material for lithium-ion batteries. Journal of Materials Chemistry (2011), 21(43), 17297-17303.
European Patent Office, Extended European Search Report for applicaton 16856282.5, dated Feb. 26, 2019.
Marom, R, et al. "Revisiting LiClO4 as an electrolyte for rechargeable lithium-ion batteries." Journal of The Electrochemical Society 157.8 (2010): A972-A983.

* cited by examiner

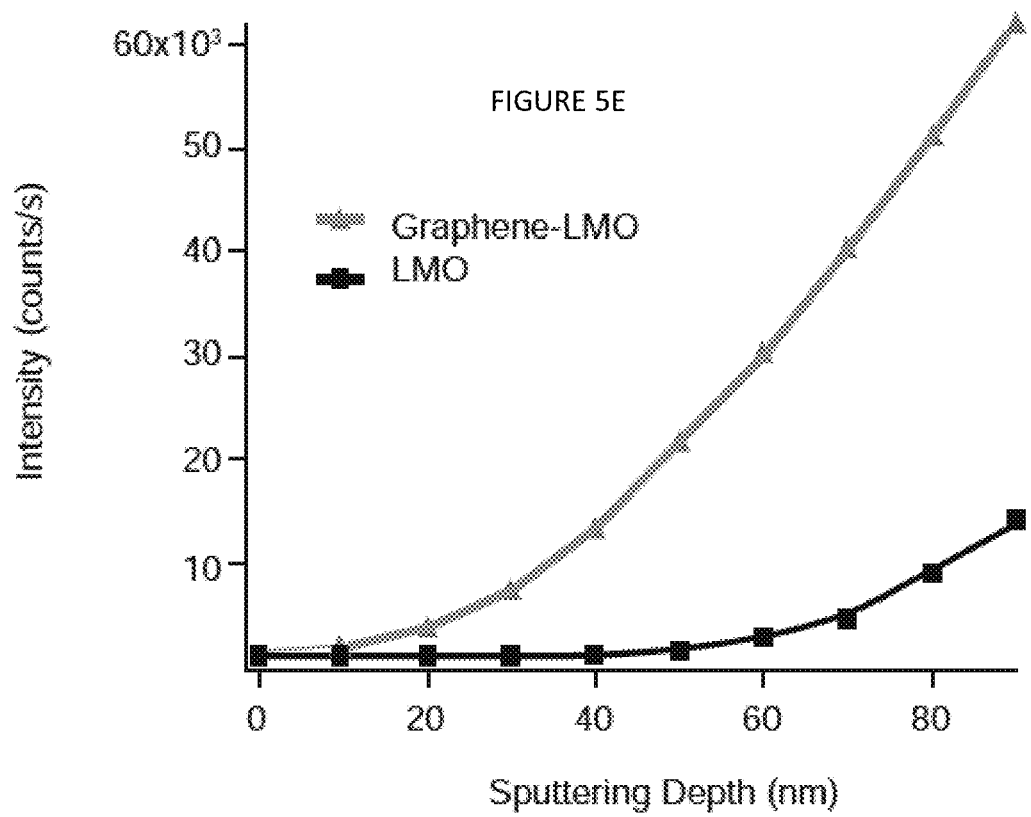
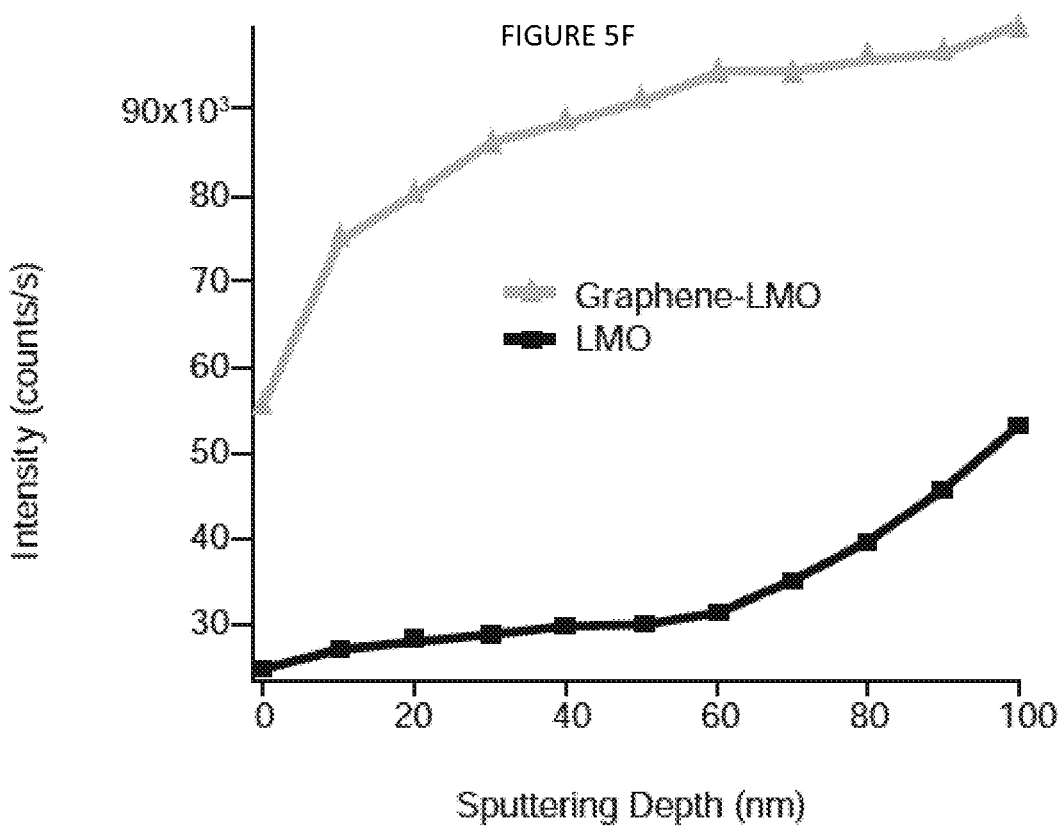

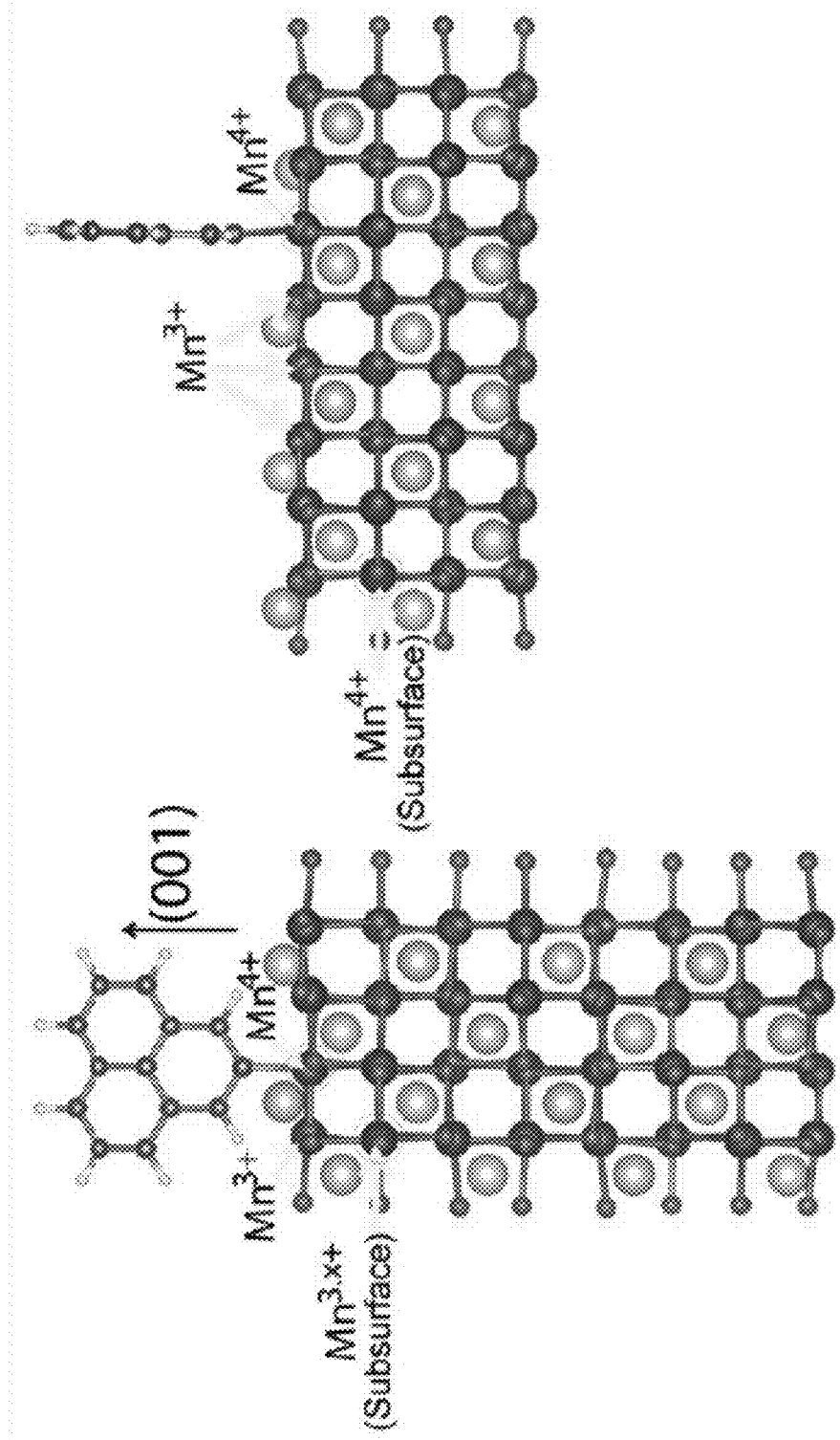

GRAPHENE-COATED METAL OXIDE SPINEL CATHODES

STATEMENT OF GOVERNMENT INTEREST

This invention was made with government support under DE-AC02-06CH11357 (Argonne National Laboratories subcontract to Northwestern University, 4F-32002) awarded by the Department of Energy. The government has certain rights in the invention.

FIELD OF INVENTION

The invention is directed to an electrode. In particular, the invention is directed to a graphene-coated metal oxide spinel cathode.

BACKGROUND

The race to make faster charging, higher capacity, less expensive, and more reliable lithium-ion batteries has been ongoing since they were commercialized by Sony in 1991.[1,2] While modern-day commercial lithium-ion batteries for portable electronic devices primarily employ $LiCoO_2$ cathodes, manganese oxides are more attractive for heavy-duty transportation applications, such as all-electric and hybrid-electric vehicles, because they are abundant, low cost, and environmentally friendly materials.[1,3] In the ideal $LiMn_2O_4$ (LMO) spinel crystal structure, the manganese ions alternate between close-packed oxygen planes in a 3:1 ratio, creating a three-dimensional network of interconnected interstitial sites for lithium-ion transport.[4,5] This structure allows for rapid lithiation/delithiation (discharge/charge) reactions that are required for high power applications. Furthermore, LMO offers improved thermal stability relative to $LiCoO_2$, especially in a highly delithiated state, resulting in safer batteries.[6]

However, a major disadvantage of LMO spinel cathodes is that they lose capacity following long term cycling due to $Mn^{2+}$ dissolution from the surface of the cathode into the electrolyte during charge/discharge as a result of the disproportionation reaction: $2Mn^{3+} \rightarrow Mn^{4+} + Mn^{2+}$.[7,8] Researchers have attempted to mitigate $Mn^{3+}$ dissolution with a number of modifications. One type of modification is to change the composition of the parent LMO electrode by cation substitution (e.g., $Li M_x Mn_{2-x} O_4$, M=Li, Co, Ni, Zn)[9-14] to reduce the amount of $Mn^{3+}$ in the structure. An alternative modification is to provide a protective surface oxide coatings, including. $Al_2O_3$,[15] $ZrO_2$,[16] $Y_2O_3$,[17] and $TiO_2$.[7] For example, Ju et al., disclosed a hybrid graphene/$Y_2O_3$/$LiMn_2O_4$ microsphere and suppression of the $Mn^{3+}$ dissolution by the $Y_2O_3$ oxide that surrounded the $LiMn_2O_4$ core [J. Alloy and Compounds 2014, 584, 454]. In yet another modification, Zhuo et al. disclose the use of liquid polyacrylonitrile (LPAN) to prepare a "graphene-like" membrane as a protective coating that is about 3 nm thick, i.e. approximately one order of magnitude thicker than graphene [J. Power Sources 2014, 247, 721].

Despite attempts to mitigate $Mn^{3+}$ dissolution, the realization of a thin and uniform surface film that does not compromise surface conductivity remains an outstanding challenge.

SUMMARY OF THE INVENTION

Lithium manganese oxide (LMO) with a spinel crystal structure is a low cost and environmentally friendly cathode material. However, manganese from LMO dissolves in the Li-ion battery electrolyte as a result of battery usage. Disclosed herein are materials and methods to suppress manganese dissolution and enhance the performance of LMO cathodes. In particular, single-layer graphene coatings suppress manganese dissolution, thus enhancing the performance and lifetime of LMO cathodes. Relative to lithium cells with uncoated LMO cathodes, cells with graphene-coated LMO cathodes provide improved capacity retention and enhanced cycling stability.

One aspect of the invention is a cathode comprising a metal oxide spinel film comprising lithium, manganese, and oxygen, and a graphene film, the graphene film disposed on a surface of the metal oxide film. In some embodiments, the metal oxide spinel comprises $LiMn_2O_4$. In some embodiments, the metal oxide spinel further comprises Co, Ni, Y, Ti, or Zn. In particular embodiments, the metal oxide spinel comprises LiMxMn2-xO4 and wherein M is selected from a group comprising L, Co, Ni, and Zn, and X is any real number greater than or equal to zero and less than or equal to two. In some embodiments, the metal oxide spinel film may have a thickness greater than or equal to 100 nm and less than or equal to 150 nm. In some embodiments, the graphene film comprises a substantially monolayer graphene film. In some embodiments, the graphene film comprises less than or equal to 20% double-layer graphene islands. In some embodiments, the graphene film is substantially free of vacancy defects. In some embodiments, the graphene film is substantially free of vacancy defects having greater than or equal to 3 vacant carbon atoms. In certain embodiments, a manganese atom is bound in the vacancy defect of the graphene film.

In certain embodiments, the metal oxide spinel film comprises a plurality of manganese atoms having a bulk oxidation state and a plurality of manganese atoms having a surface oxidation state, wherein the surface oxidation state is greater than the bulk oxidation state. In certain embodiments, the bulk oxidation state is +3. In certain embodiments, the surface oxidation state is greater than +3. In particular embodiments, the surface oxidation state is +4. In some embodiments, bonding of the graphene film with the surface of the metal oxide spinel film may result in a change to the oxidation state of a metal ion in the surface of the metal oxide spinel film. In some embodiments, the change in the oxidation state is to make the oxidation state more positive. In certain embodiments, the change in the oxidation state is from +3 to +4.

In some embodiments, the cathode is configured to form a solid electrolyte interphase layer disposed on the graphene film when the cathode is contacted with an electrolyte. In some embodiments, the solid electrolyte interphase layer comprises lithium carbonate. In some embodiments, the solid electrolyte interphase film has a thickness of less than or equal to 100 nm, 90 nm, 80 nm, 70 nm, 60 nm, 50 nm, 40 nm, 30 nm, 20 nm, or 10 nm. In some embodiments, the solid electrolyte interphase film has a thickness greater than or equal to 1 nm, 2 nm, 3 nm, 4 nm, 5 nm, 6 nm, 7 nm, 8 nm, 9 nm, or 10 nm. In certain embodiments, the solid electrolyte interphase film has a thickness of greater than or equal to 1 nm, 2 nm, 3 nm, 4 nm, 5 nm, 6 nm, 7 nm, 8 nm, 9 nm, or 10 nm and less than or equal to 100 nm, 90 nm, 80 nm, 70 nm, 60 nm, 50 nm, 40 nm, 30 nm, 20 nm, or 10 nm.

A second aspect of the invention is an electrochemical cell comprising any of the cathodes described above, an anode, and an electrolyte. In some embodiments, the anode comprises lithium or graphite. In some embodiments, the electrolyte comprises a lithium salt and an organic carbonate solvent. In some embodiments, the electrolyte comprises 1 M LiClO$_4$ in a solution of 1:1 ethylene carbonate:dimethyl carbonate.

Another aspect of the invention is a method for preparing any of the cathodes described above, the method comprising: obtaining a metal oxide spinel film comprising lithium, manganese, and oxygen; obtaining a graphene film; and transferring the graphene film onto a surface of the metal oxide spinel film. In some embodiments, the metal oxide spinel film is prepared on a first support and wherein the graphene film is prepared on a second support. In some embodiments, the transferring step comprises preparing a transfer support on the graphene film; removing the second support; disposing the graphene film on the metal oxide spinel film.

In some embodiments, the method further comprising removing the transfer support. In some embodiments, the metal oxide spinel film is prepared by sputtering. In some embodiments, the graphene film is prepared by chemical vapor deposition. In some embodiments, the metal oxide spinel film comprises LiMn$_2$O$_4$. In some embodiments, the metal oxide spinel further comprises Co, Ni, Y, Ti, or Zn. In particular embodiments, the metal oxide spinel comprises LiMxMn2-xO4 and wherein M is selected from a group comprising L, Co, Ni, and Zn, and X is any real number greater than or equal to zero and less than or equal to two. In some embodiments, the metal oxide spinel film has a thickness greater than or equal to 100 nm and less than or equal to 150 nm. In some embodiments, the graphene film comprises a substantially monolayer graphene film. In some embodiments, the graphene film comprises less than or equal to 20%, 15%, 10%, or 5% double-layer graphene islands. In some embodiments, the graphene film is substantially free of vacancy defects. In some embodiments, the graphene film is substantially free of vacancy defects having greater than or equal to 3 vacant carbon atoms. In some embodiments, a mangense atom is bound in the vacancy defect.

In some embodiments, the method further compress exposing the cathode to an electrolyte under conditions sufficient to form a solid electrolyte interphase layer, wherein the second film is deposed between the first film and the solid electrolyte interphase layer. In some embodiments, the conditions sufficient to form the solid electrolyte interphase layer comprise applying current during charge/discharge cycles when the graphene coating is in contact with the electrolyte.

In some embodiments, the solid electrolyte interphase layer comprises lithium carbonate. In some embodiments, the solid electrolyte interphase film has a thickness of less than or equal to 100 nm, 90 nm, 80 nm, 70 nm, 60 nm, 50 nm, 40 nm, 30 nm, 20 nm, or 10 nm. In some embodiments, the solid electrolyte interphase film has a thickness greater than or equal to 1 nm, 2 nm, 3 nm, 4 nm, 5 nm, 6 nm, 7 nm, 8 nm, 9 nm, or 10 nm. In certain embodiments, the solid electrolyte interphase film has a thickness of greater than or equal to 1 nm, 2 nm, 3 nm, 4 nm, 5 nm, 6 nm, 7 nm, 8 nm, 9 nm, or 10 nm and less than or equal to 100 nm, 90 nm, 80 nm, 70 nm, 60 nm, 50 nm, 40 nm, 30 nm, 20 nm, or 10 nm. In some embodiments, electrolyte comprises a lithium salt in an organic carbonate solvent. In certain embodiments, the electrolyte comprises 1 M LiClO$_4$ in a solution of 1:1 ethylene carbonate:dimethyl carbonate. In some embodiments, the conditions sufficient to form the solid electrolyte interphase layer comprise applying current during charge/discharge cycles when the graphene coating is in contact with the electrolyte.

In some embodiments, the first support comprises a metal. In certain embodiments, the metal is steel. In some embodiments, the second support comprises a metal. In certain embodiments, the metal is copper or steel. In some embodiments, the transfer support comprises a poly(methyl methacrylate) or a polydimethylsiloxane.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention.

FIG. 5E shows the variation of Mn 2P (3/2) peak intensity versus depth for graphene-coated LMO and uncoated LMO after lithiation/delithiation in a lithium half cell (3.5 to 4.4 V) for 750 and 350 cycles, respectively.

FIG. 5F shows the variation of of Mn 2P (3/2) peak intensity versus depth for graphene-coated LMO and uncoated LMO after lithiation/delithiation in graphite/LMO full cells (2 to 4.4 V) for 100 cycles.

FIG. 11A shows the chemical structure of a graphene patch adsorbed perpendicularly on a "Long" slab of a (001) $Li_{16}Mn_{32}O_{64}$ surface.

FIG. 11B shows the chemical structure of a graphene patch adsorbed perpendicularly on a "Wide" slab of a (001) $Li_{16}Mn_{32}O_{64}$ surface.

DETAILED DESCRIPTION

Figure 1:
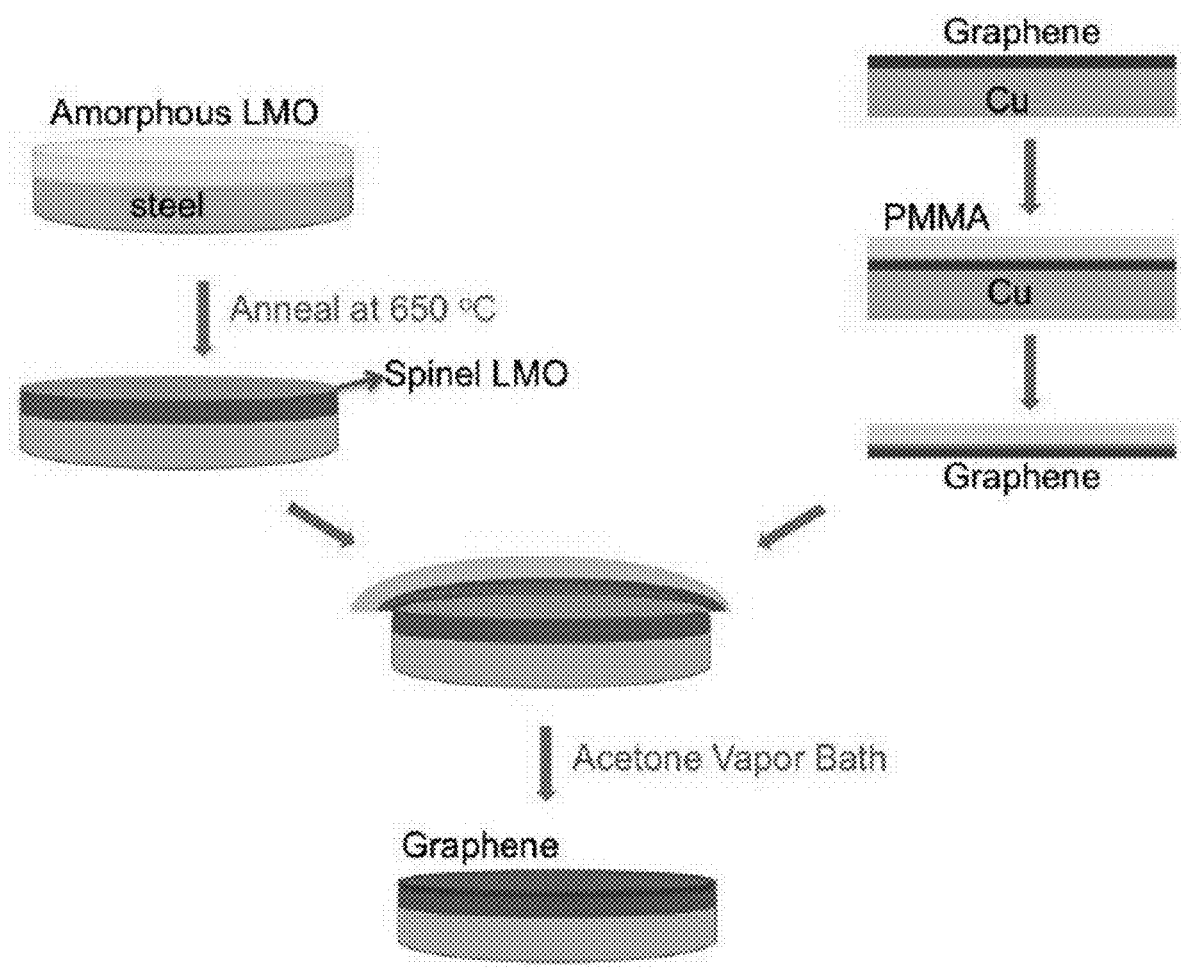
FIG. 1 shows a schematic illustration of the sample preparation process. Graphene may be grown using chemical vapor deposition (CVD) on copper foil and then transferred on top of spinel LiMn$_2$O$_4$ (LMO) thin films using a poly(methyl methacrylate) (PMMA) transfer method. The thin film LMO may be made by RF sputtering of amorphous LMO and annealing.

Disclosed are graphene-coated metal oxide spinel cathodes that can significantly reduce capacity fade of the metal oxide spinel in an electrochemical cell such as a lithium-ion battery. Surprisingly, the graphene-coating on the metal oxide spinal cathode substantially suppresses $Mn^{3+}$ dissolution. Moreover, the graphene-coating provides a selective diffusion barrier for manganese ions, aides in the formation of a thin and well defined solid-electrolyte interphase layer (SEI), and interacts with $Mn^{3+}$ ions at the surface to increase the oxidation state to $Mn^{4+}$.

Graphene-Coated Metal Oxide Spinels

The cathodes described herein include cathodes comprising a metal oxide spinel film comprising lithium, manganese, and oxygen, and a graphene film, the graphene film disposed on a surface of the metal oxide film. In certain embodiments, the cathode is configured to form a solid electrolyte interphase layer disposed on the graphene film when the cathode is contacted with an electrolyte. The cathodes disclosed herein may be used in a number application, including cathodes comprising lithium, manganese, and oxygen for use in lithium-ion batteries.

Investigation of the cathodes by X-ray photoelectron spectroscopy (XPS) depth profiling shows that manganese dissolution from graphene-coated LMO cathodes is significantly reduced compared to uncoated LMO cathodes. Furthermore, cross-sectional transmission electron microscopy (TEM) reveals a well-defined SEI layer on graphene-coated LMO cathodes.

In silico modeling of the cathodes described herein provide insight in the mechanisms that underlie the suppression of manganese dissolution by single-layer graphene. Specifically, DFT calculations show that common graphene defects are selective diffusion barriers for manganese ions in comparison to lithium. Furthermore, DFT calculations demonstrate that graphene interacts with Mn3+ ions at the (001) surface of LMO in a manner that increases their oxidation state to Mn4+, thus arresting manganese dissolution.

Metal Oxide Spinel

The metal oxide spinel may be any metal oxide spinel material suitable for use as an electrode. In certain embodiments the metal oxide spinel comprises lithium, manganese, and oxygen. Optionally, the metal oxide spinel may be a lithium manganese oxide (LMO) material. In certain particular embodiments, the metal oxide spinel may comprise $LiMn_2O_4$. The metal oxide spinel may comprise elements other than Li, Mn, and O, including without limitation Co, Ni, Y, Ti, and Zn. In certain embodiments that metal oxide spinel may comprise $LiM_xMn_{2-x}O_4$ where M=Li, Co, Ni, or Zn and X is any real number greater than or equal to zero (0) and less than or equal to two (2). In certain embodiments the metal oxide spinel may be a single crystal. In other embodiments the metal oxide spinel may be polycrystalline. For a polycrystalline metal oxide spinel, the metal oxide spinel material may be substantially free of additional materials that bind the crystal grains together.

The metal oxide spinel is prepared as a film. In certain embodiments, the film may be substantially planar. The film may have a thickness ("T") of greater than or equal to 100 nm, greater than or equal to 110 nm, greater than or equal to 120 nm, or greater than or equal to 130 nm, or greater than or equal to 140 nm. The film may have a T of less than or equal to 150 nm, less than or equal to 140 nm, less than or equal to 130 nm, less than or equal to 120 nm, or less than or equal to 110 nm. In certain embodiments the film has a T from 100 nm to 150 nm, including without limitation every thickness between 100 nm and 150 nm.

The film may be prepared in any shape, including without limitation a disk or rectangular parallelepiped. For a disk, the T will be substantially less than the length of the diameter ("D"). In some embodiments, D may be greater than 1 cm. In some embodiments, D may be less than 2 cm. In certain embodiments, D may be between 1 cm to 2 cm, including without limitation every D between 1 cm and 2 cm. For a parallelepiped, the thickness will be substantially less than the length of the other two dimensions ("L1" and "L2"). In some embodiments, L1 and/or L2 may be greater than 1 cm. In some embodiments, L1 and/or L2 may be less than 2 cm. In certain embodiments, L1 and/or L2 may be between 1 cm to 2 cm, including without limitation every L1 and/or L2 between 1 cm and 2 cm.

Disposing the graphene film on a surface of the metal oxide spinel results in structural and electronic changes to the metal oxide spinel. The metal oxide spinel film may comprise a bulk region and a surface region. The bulk region is characterized by its similarity to the bulk metal oxide spinel. The surface region is between the bulk region and the graphene film. The surface region may be greater than or equal to 1, greater than or equal to 10, greater than or equal to 100, greater than or equal to 200, greater than or equal to 300, greater than or equal to 400, greater than or equal to 500, greater than or equal to 600, greater than or equal to 700, greater than or equal to 800, greater than or equal to 900 atomic layers. The surface region may be less than or equal to 1000, less than or equal to 900, less than or equal to 800, less than or equal to 700, less than or equal to 600, less than or equal to 500, less than or equal to 400, less than or equal to 300, less than or equal to 200, less than or equal to 100, less than or equal to 10 atomic layers. In certain embodiments, the surface region is between 1 to 1000 atomic layers, including without limitation every number of atomic layers between 1 and 1000.

The graphene film may chemically bond to the surface of the metal oxide spinel film. The chemical bonding of the graphene film may result in structural and electronic changes in the metal oxide spinel film. In certain embodiments the graphene film bonds to the metal atoms as in the metal oxide spinel film. The bonding of the graphene film with the surface of the metal oxide spinel may result in a change to the oxidation state of a metal ion in the surface of the metal oxide spinel film. In certain embodiments, the change in the oxidation state is to make the oxidations state more positive. In certain particular embodiments, the graphene film may bond with the Mn atoms on the surface of a LMO film, resulting in the Mn atom changing oxidation state from +3 to +4. In certain embodiments, the bonding of the graphene film with the surface may also suppress a Jahn-Teller distortion in the metal oxide spinel film.

In certain embodiments, the metal oxide spinel may be disposed on a support. In certain embodiments, the support may be conductive. In other embodiments, the support may be nonconductive.

Graphene Coating

The graphene film or coating is disposed on a surface of the metal oxide spinel and functions as a barrier between the metal oxide spinal and an electrolyte. In certain embodiments, the graphene film comprises a substantially monolayer graphene film. In certain embodiments the graphene film comprises less than or equal to 20%, 19%, 18%, 17%, 16%, 15%, 14%, 13%, 12%, 11%, 10%, 9%, 8%, 7%, 6%, or 5% double-layer graphene islands.

The graphene film may have vacancy defects arising from missing carbon atoms. In certain embodiments the graphene film is substantially free from vacancy defects. In certain embodiments the graphene film is substantially free from vacancy defects having greater than or equal to 3 vacant carbon atoms. In certain embodiments, the metal as in the metal oxide spinel may be bound by a vacancy defect.

Because large vacancy defects prevent the graphene film from protecting the metal oxide spinel, large vacancy defects are generally undesirable. Smaller vacancy defects, however, may provide a selective barrier that allows for the passage of certain atoms while binding others. A di-vacancy defect in the graphene film may provide little to no barrier for Li passage through the vacancy defect while the same di-vacancy defect may provide a substantial barrier for the passage of Mn or bind the Mn atom by forming one or more Mn—C bonds between the metal and the graphene film.

Solid-Electrolyte Interphase Layer

The graphene-coated metal oxide spinel may form a solid electrolyte interphase (SEI) layer upon contact with an electrolyte. The SEI layer is disposed on the graphene film at the interface between the graphene film and an electrolyte.

A surprising and advantageous aspect of the present invention is that the SEI layer formed is thin and well defined. The thin and dense SEI layer limits the access of the electrolyte to the surface of the metal oxide spinel while also providing for a minimal diffusion barrier for a carrier ion. In contrast to the graphene-coated metal oxide spinel, the bare metal oxide spinel reacts strongly with the electrolyte, depleting metal from the metal oxide spinel and causing substantially greater SEI buildup. As a result, the thin and dense SEI layer formed on the surface of the graphene film protects the metal oxide spinel from metal dissolution while also minimizing the diffusion barrier.

In certain embodiments the solid electrolyte interphase film has a thickness of less than or equal to 100 nm, 90 nm, 80 nm, 70 nm, 60 nm, 50 nm, 40 nm, 30 nm, 20 nm, or 10 nm and/or greater than or equal to 1 nm, 2 nm, 3 nm, 4 nm, 5 nm, 6 nm, 7 nm, 8 nm, 9 nm, or 10 nm.

The electrolyte may be any electrolyte suitable for forming a thin and dense SEI. In some embodiments, the electrolyte is a Li-containing salt. In certain embodiments, the electrolyte is $LiClO_4$. In certain embodiments, the electrolyte is in solution with one or more organic carbonates. In certain embodiments the one or more organic carbonates is ethylene carbonate and/or dimethyl carbonate. In certain embodiments the electrolyte is a solution of 1 M $LiClO_4$ in 1:1 by volume of ethylene carbonate and dimethyl carbonate was used as the electrolyte.

Conditions sufficient to form the SEI comprise applying current during charge/discharge cycles when the graphene coating is in contact with the electrolyte. During the charge/discharge cycles, the electrolyte reacts on the surface of the electrode to create an SEI. Graphene helps promote a thin and dense SEI on the surface because its chemical properties enable uniform SEI formation. For an electrolyte solution comprising a Li-containing salt, e.g., $LiClO_4$, and one or more organic carbonates, during cycling the electrolyte can react on the surface to promote SEI formation by creating a layer of lithium carbonate. Although dimethyl carbonate has been shown to promote SEI formation on graphite during cycling, it was surprising that the thin and dense SEI formed on the graphene-coated electrode would have good electrical properties while also suppressing manganese dissolution.

Electrochemical Cells

Another aspect of the invention is electrochemical cells that use graphene-coated metal oxide spinels as an electrode. The electrochemical cells comprise the graphene-coated metal oxide spinel as an electrode, a counter electrode, and an electrolyte. In certain embodiments, the graphene-coated metal oxide spinel is a cathode and the counter electrode is an anode. The electrochemical cell may have a half-cell geometry or a full-cell geometry. In certain embodiments, the electrochemical cell is a Li-ion battery.

For an embodiments with a half-cell geometry, the counter electrode may be lithium foil anode. The lithium foil may have any suitable purity, thickness and/or surface area. In certain embodiments, the anode material for the half-cell geometry is a lithium foil having a thickness of 1.5 mm and area of 1.92 $cm^2$ with 99.9% purity. For an embodiment with a full-cell geometry, the counter electron may be a graphite anode. The graphite anode may have any suitable purity, thickness and/or surface area. For graphite anodes, it may be necessary to lithiate the anode. For example, one may be able to prepare suitable graphite anodes (e.g., Conoco Phillips CGPA12 6.06 mg $cm^{-2}$) having an area of 1 $cm^2$, which were lithiated to 0.02 V and delithiated to 2 V once with lithium anodes to form a stable SEI and then partially lithiated to 0.2 V.

The electrolyte may be any suitable electrolyte for the electrochemical cell. In certain embodiments, the electrolyte may be an electrolyte capable of forming a thick and dense SEI as described above. In certain embodiments, the electroly is 1 M $LiClO_4$ in 1:1 by volume ethylene carbonate and dimethyl carbonate.

Methods of Forming Graphene-Coated Metal Oxide Spinels

In certain embodiments, the graphene-coated metal oxide spinel electrodes are prepared by preparing the metal oxide spinel film, preparing a graphene film, and transferring the graphene film onto a surface of the metal oxide spinel film.

Obtaining a Metal Oxide Spinel

The metal oxide spinel may be obtained by any suitable preparation method. In one embodiment the metal oxide spinel film is prepared by sputtering the components of the target metal oxide spinel onto a first support under conditions suitable for depositing the components onto the support and annealing the components under suitable conditions for forming the spinel crystals or crystallites. The support may be any suitable material, but in certain embodiments the support is a metal. In certain embodiments, the first support is steel or stainless steel.

Obtaining Graphene

The graphene film may be obtained by any suitable method. In one embodiment, the graphene film is prepared by chemical vapor deposition (CVD) on a second support. In certain embodiments the conditions are suitable for preparing substantially single-layer graphene and/or graphene substantially free of vacancy defects or grain boundaries. The second support may be a metal. In certain embodiments the second support is a copper or a steel support.

Transferring a Graphene Film onto a Metal Oxide Spinel

The graphene film may be transferred onto the metal oxide spinel by any suitable method. In one embodiment, the transferring step comprises preparing a transfer support on the graphene file, removing the second support, and disposing the graphene film on the metal oxide spinel. In certain embodiments, the transfer support may be spin coated onto the graphene film. The transfer support may be any suitable material. In certain embodiments the transfer support is poly(methyl methacrylate) (PMMA) or polydimethylsiloxane (PDMS).

The transfer support may be removed by any suitable method. For embodiments employing PMMA, the transfer support may be removed by suspending the graphene-coated metal oxide spinel over an acetone vapor bath to remove the PMMA without peeling the graphene off the metal oxide spinel substrate.

Miscellaneous

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred aspects of this invention are described herein, including the best mode known to the inventors for carrying out the invention. Variations of those preferred aspects may become apparent to those of ordinary skill in the art upon reading the foregoing description. The inventors expect a person having ordinary skill in the art to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

EXAMPLES

Preparation of Lithium Manganese Oxide Films

A 125 nm thin film of amorphous LMO was deposited by sputtering on a stainless steel current collector[27] and annealed to form spinel crystallites (FIG. 1). FIG. 1 shows a schematic illustration of the sample preparation process. Graphene may be grown using chemical vapor deposition (CVD) on copper foil and then transferred on top of spinel LiMn2O4 (LMO) thin films using a poly(methyl methacrylate) (PMMA) transfer method. The thin film LMO may be made by RF sputtering of amorphous LMO and annealing.

Figure 2A:
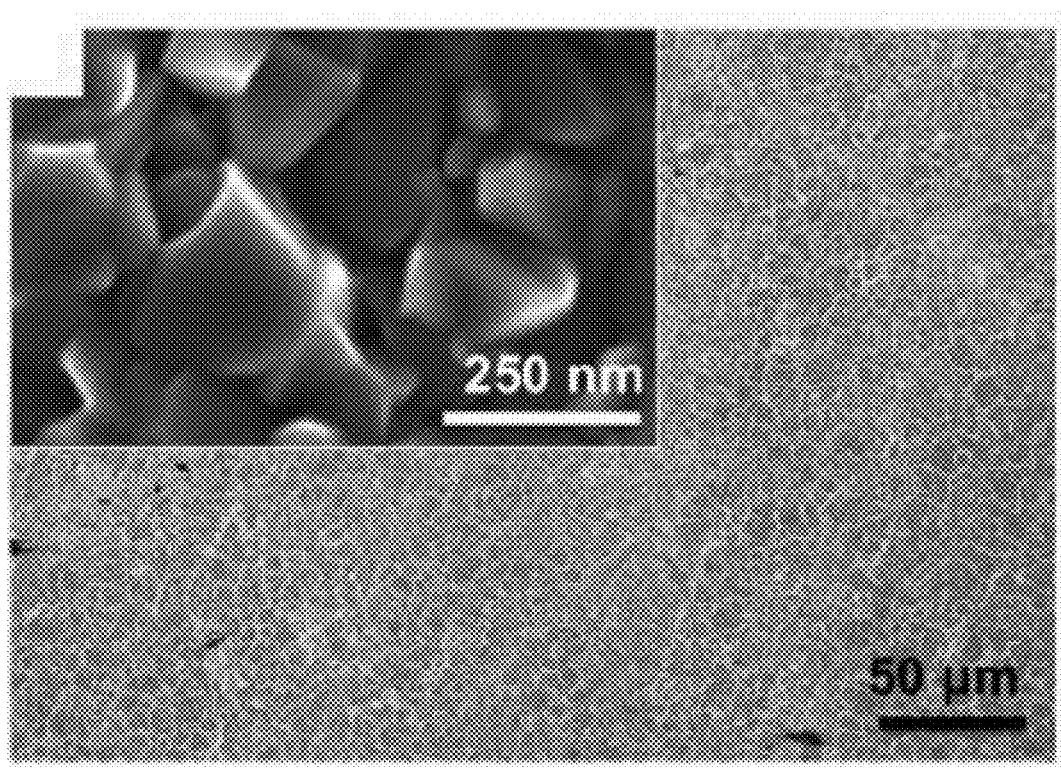
FIG. 2A shows an SEM image of spinel LMO thin films.
Figure 2B:
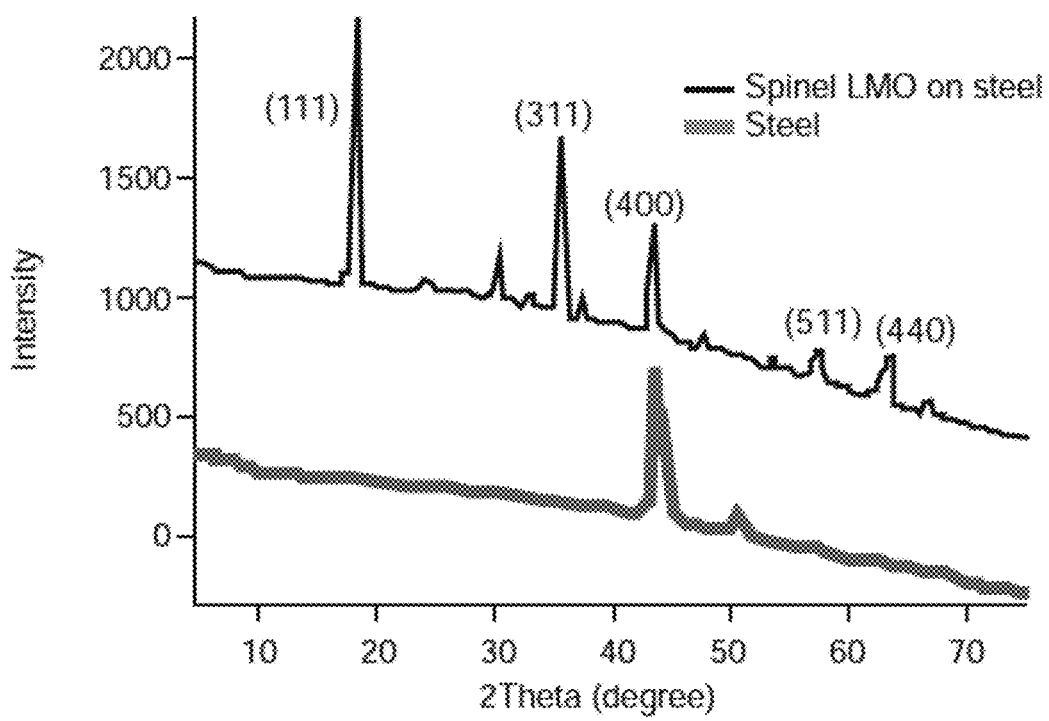
FIG. 2B shows a grazing incidence X-ray diffraction of LMO thin films showing a spinel crystal structure.

FIG. 2A shows a scanning electron microscopy (SEM) image of a typical LMO thin film. The SEM images reveal that the LMO crystallites manifest themselves as truncated octahedra that have been previously studied for high power and longevity applications.[28] The spinel structure is also confirmed by grazing incidence (GI) X-ray diffraction (XRD) (FIG. 2B). The refined lattice parameter, a, of the sputtered LMO product is 8.29±0.04 Å, which is within experimental error of pure $LiMn_2O_4$ (8.25 Å).[29] The slightly larger value may be attributed, in part, to the small amount of iron[30] that diffuses into the structure from the stainless steel substrate upon annealing.

LMO thin films were deposited on a stainless steel coin cell spacer (MTI Corporation) by RF sputtering using an AJA Orion sputter system. The $LiMn_2O_4$ target was also purchased from AJA International Inc. The sputtering was performed at 150 W for 7 hr at room temperature with 6 sccm $O_2$ and 20 sccm Ar at 5 mTorr. Thereafter, the pressure was increased to 10 Torr by flowing 20 sccm $O_2$, the temperature was increased to 670±20° C. at 25° C./min, and the samples were annealed at this temperature for 1 hr. The samples were then cooled, in the same $O_2$ atmosphere, to room temperature in 30 min. The back of the stainless steel was polished to remove the oxide before the samples were used for further characterization.

Preparation of Graphene Coatings

A single-layer graphene (<15% double-layer graphene islands) film was grown on an electropolished copper foil by chemical vapor deposition (CVD). CVD graphene on copper has been optimized to obtain mainly single-layer graphene with a uniform distribution of defects (e.g., grain boundaries, vacancies, etc.).[31]

Graphene films (~80% monolayer) were grown on Cu foil using chemical vapor deposition (CVD). Initially, 80 μm thick Cu foil was cleaned with acetone and isopropanol. The Cu foil was then electropolished in a 3:1 by volume mixture of $H_3PO_4$ (85%) and poly(ethylene glycol) at an applied voltage of 2.0 V for 30 min. After electropolishing, the residual acid on the Cu foil was neutralized using a 1% ammonia in water solution and rinsed with deionized water. The Cu foil was then placed in a CVD tube furnace and pumped down to ~30-50 mTorr. An $Ar:H_2$ (4:1) gas mixture was used to flush the system, raising the total pressure to 100 mTorr. The temperature was then linearly increased to 1000° C. in 1 hr. At 1000° C., 10 sccm of methane was added, which increased the pressure to 300 mTorr. The sample was held at this condition for 30 min, during which graphene growth occurred. After the growth step, the reactor was cooled to 800° C. in 15 min, and the methane flow was discontinued. The system was then allowed to cool rapidly to room temperature.

Transferring the Graphene Coating

CVD graphene was transferred onto the LMO thin films using a poly(methyl methacrylate) (PMMA) transfer method.[32] The graphene/LMO samples were characterized by SEM and Raman spectroscopy to determine the extent of graphene coverage (>90% coverage was estimated by low magnification SEM images). After CVD growth, poly(m-ethyl methacrylate) (PMMA) was spin coated on top of the Cu foil/graphene at 2000 rpm. The PMMA was left to dry on the sample for at least 6 hr at room temperature. The Cu was subsequently etched in Marble's reagent (8 g $CuSO_4$, 50 mL $H_2O$, 50 mL HCl) for ~4 hr. Once all of the Cu was etched from the film, the PMMA/graphene was rinsed 3 times using deionized water baths to remove any remaining Marble's reagent. The PMMA/graphene film was then transferred onto the LMO/steel substrate. The samples were air dried and then placed in a vacuum oven overnight to remove residual water from the transfer and improve graphene adhesion to the substrate. The samples were subsequently suspended over an acetone vapor bath for ~3 hr to gently remove the PMMA without peeling the graphene off the substrate. The samples were then immersed in an acetone bath for 10 min, rinsed with isopropanol, and air-dried.

Figure 2C:
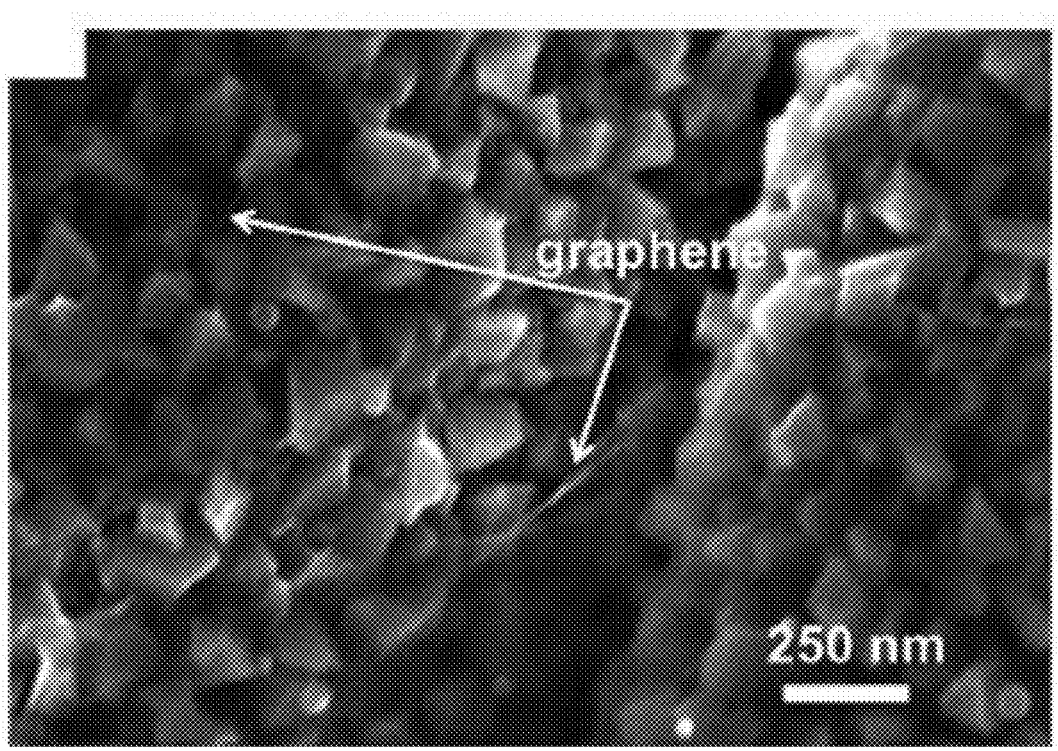
FIG. 2C shows an SEM image of graphene transferred onto a LMO thin film; the graphene is indicated by arrows.
Figure 2D:
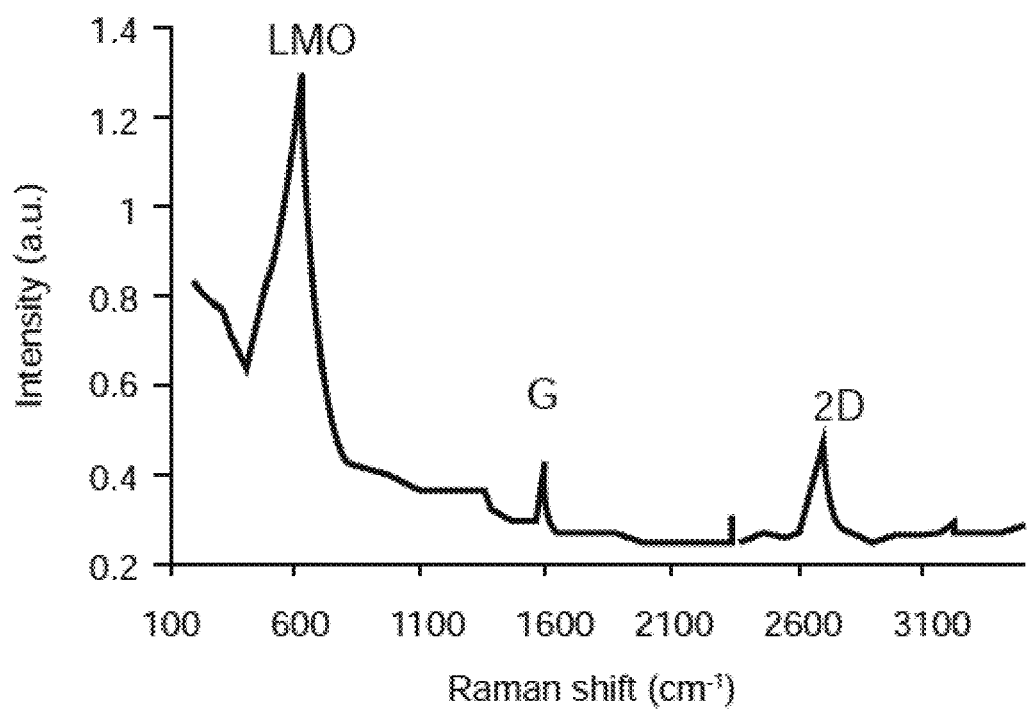
FIG. 2D shows a Raman spectrum of graphene-coated LMO obtained using a Raman laser wavelength of 514 nm. The shape of the 2D (2700 cm$^{-1}$) peak and the ratio of 2D to G (1580 cm$^{-1}$) intensity are characteristic of single-layer graphene. The high-intensity peak at ~620 cm$^{-1}$ is attributed to the Mn—O vibrational mode. This peak can be deconvoluted to a strong peak at 625 cm$^{-1}$, which is related to the Mn$^{4+}$—O bonds, and a shoulder at ~590 cm$^{-1}$, which is related to the Mn$^{3+}$—O bonds. The shallow peak at ~2500 cm$^{-1}$ is attributed to graphene D+D", and the sharp feature at ~2400 cm$^{-1}$ is due to ambient nitrogen.

Multiple spots were chosen randomly on each sample and measured by Raman to verify the graphene coverage using the graphene 2D peak. An SEM image and Raman spectrum of the graphene-coated LMO surface are shown in FIGS. 2C, D (graphene is indicated by the arrows).

Electrochemical Cycling

The LMO thin films were evaluated electrochemically in Li-ion coin cells in both half-cell and full-cell geometries (FIGS. 3-4). Coin cells were made in half-cell geometry a-d (vs. lithium) and full-cell geometry e-f (vs. graphite). 1 M $LiClO_4$ in EC/DMC (1/1) was used as electrolyte. Scan rate for cyclic voltammetry was 0.2 mV/s, and the applied current for galvanostatic charging was 100 $mA/cm^3$.

Figure 3A:
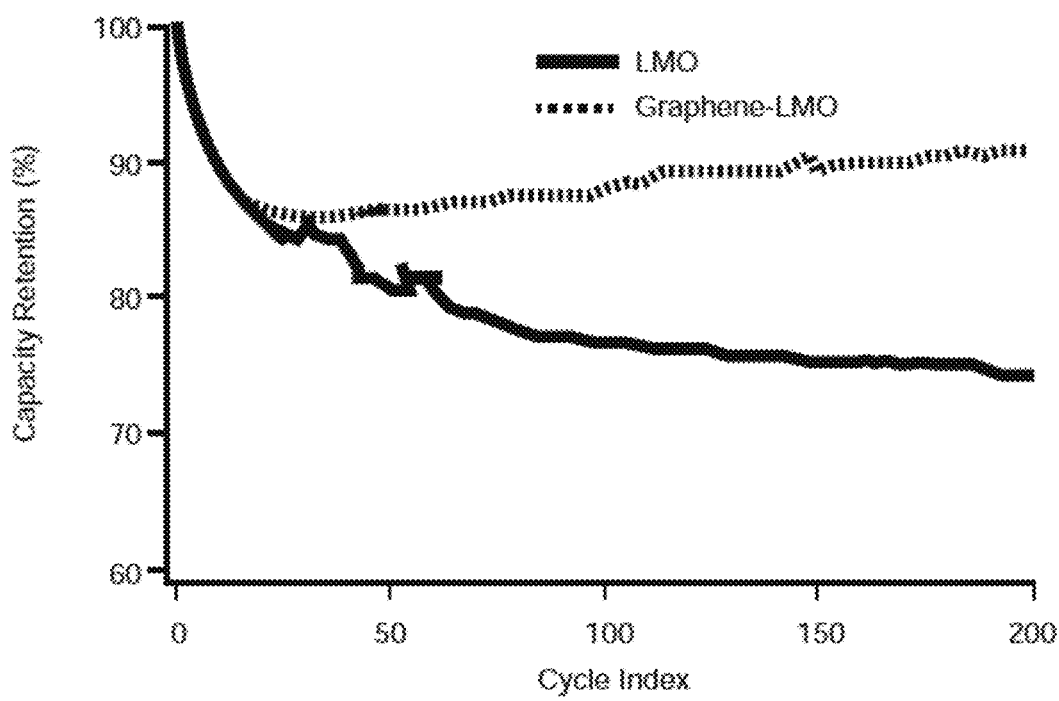
FIG. 3A shows capacity retention of LMO and graphene-LMO thin films versus cycle number for LMO and graphene-coated LMO cathodes in lithium half cells at 100 mA/cm$^3$.

Significantly, the graphene-coated LMO cathodes show superior capacity retention in half-cell testing in comparison with uncoated LMO cathodes (FIG. 3A). The LMO cathodes that were cycled in a half-cell geometry showed ~25% capacity fade after ~300 cycles and failed completely after ~350 cycles, while the graphene-coated LMO cathodes completed more than 750 cycles with ~90% capacity retention. The uncoated LMO cathode failure is correlated with significant manganese depletion as discussed below.

Cathodes were electrochemically cycled in a coin cell setup, which was fabricated in an Ar glovebox. The cycling was performed in Hohsen Corporation stainless steel coin cells using lithium metal or graphite as the counter electrode and Celgard 2320 and Whatman glass fiber separators. The electrolyte was 1 M $LiClO_4$ (Novolyte) in 1:1 by volume ethylene carbonate and dimethyl carbonate (DMC) (Novolyte, Sigma Aldrich). All coin cells were cycled using an Arbin BT2143 battery tester. The graphite anodes (Conoco Phillips CGP-A12, 6.06 $mg/cm^2$) were lithiated to 0.02 V and delithiated to 2 V once with lithium anodes to form a stable SEI and then partially lithiated to 0.2 V. The lithiation to 0.2 V was performed to reduce the capacity gap between the bulk anode and thin-film cathode while maintaining the same surface area of the two electrodes since a smaller anode resulted in uneven lithiation of the LMO film.

After cycling, the coin cells were opened in an Ar filled glove box, with <1 ppm oxygen and moisture content, to extract the cathodes. The surface of the cathode was rinsed gently with DMC and then with isopropanol to remove residual electrolyte and gently dried by placing the cathode samples upside down on a Kimwipe. The samples were sealed in a jar and then removed from the glove box for oxygen-free XPS characterization. The jar was placed in a glove bag connected to the XPS antechamber and then opened to retrieve the samples after the glove bag and the chamber were pumped and flushed with Ar three times.

The thin-film volume was estimated by using the sample thickness and surface area. The thickness was controlled by the sputtering conditions and verified by SEM and TEM cross-sectional images. The area of the sample is assumed to be equal to the substrate area (stainless steel 2032 coin cell spacer, ~1.96 $cm^2$).

Figure 4A:
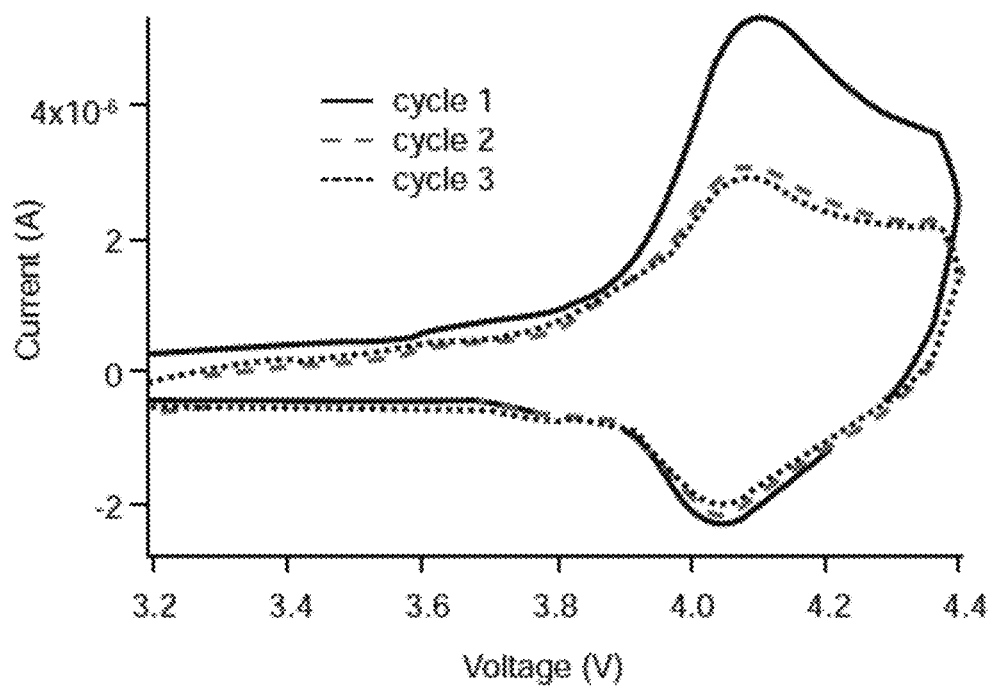
FIG. 4A shows a cyclic voltammetry curve of LMO thin film vs. lithium.
Figure 4B:
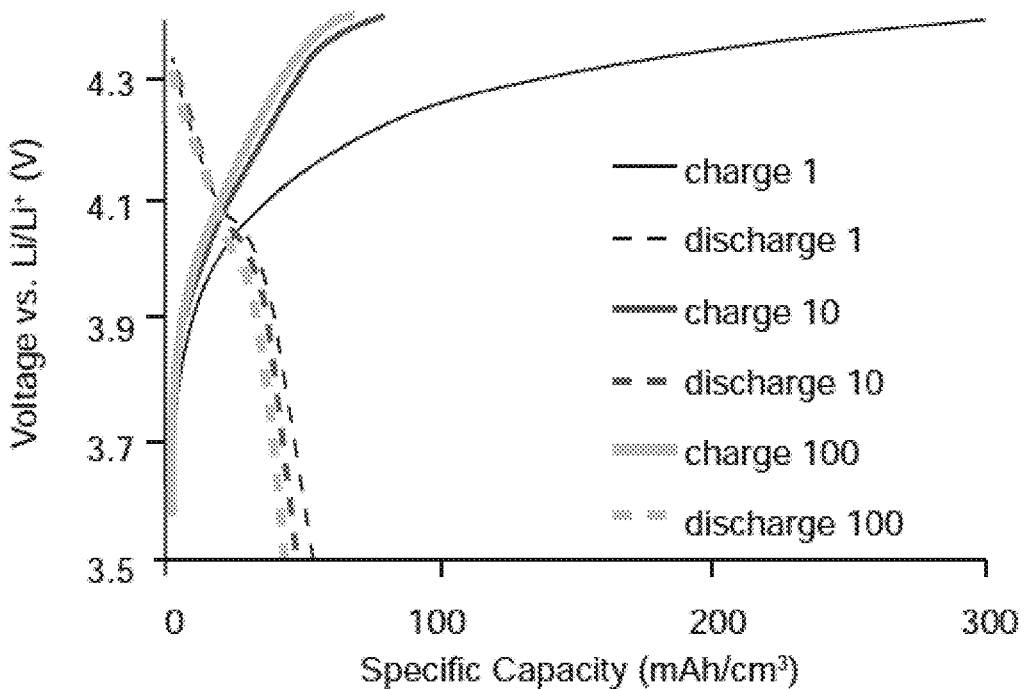
FIG. 4B shows a voltage-capacity curve of LMO thin film vs. lithium.
Figure 4C:
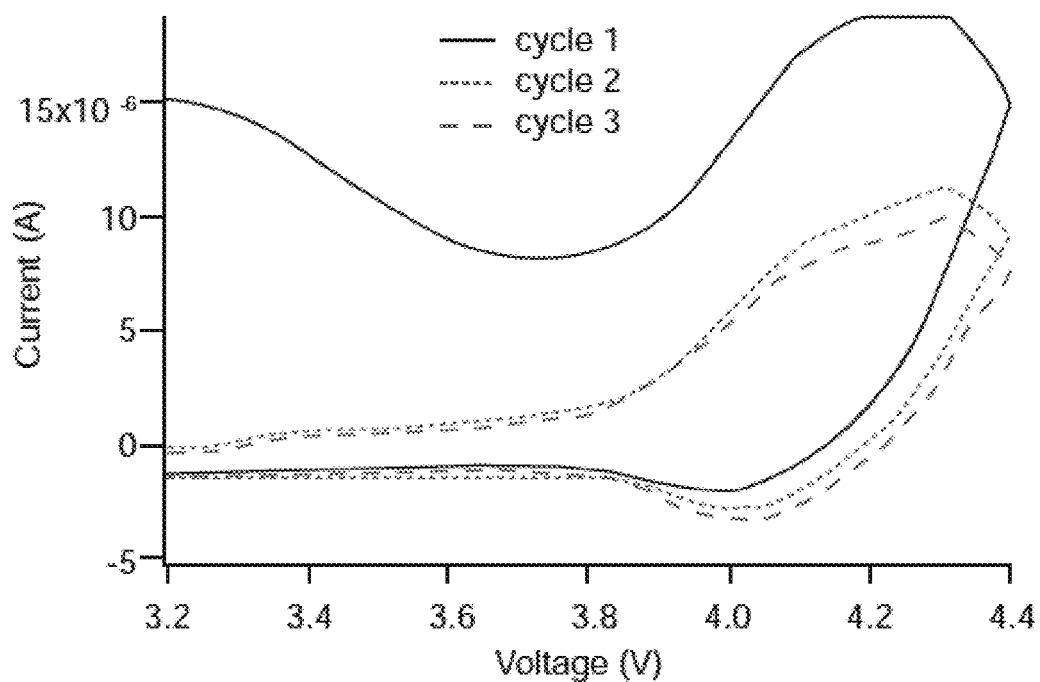
FIG. 4C shows a cyclic voltammetry curve of graphene-coated LMO thin films vs. lithium.
Figure 4D:
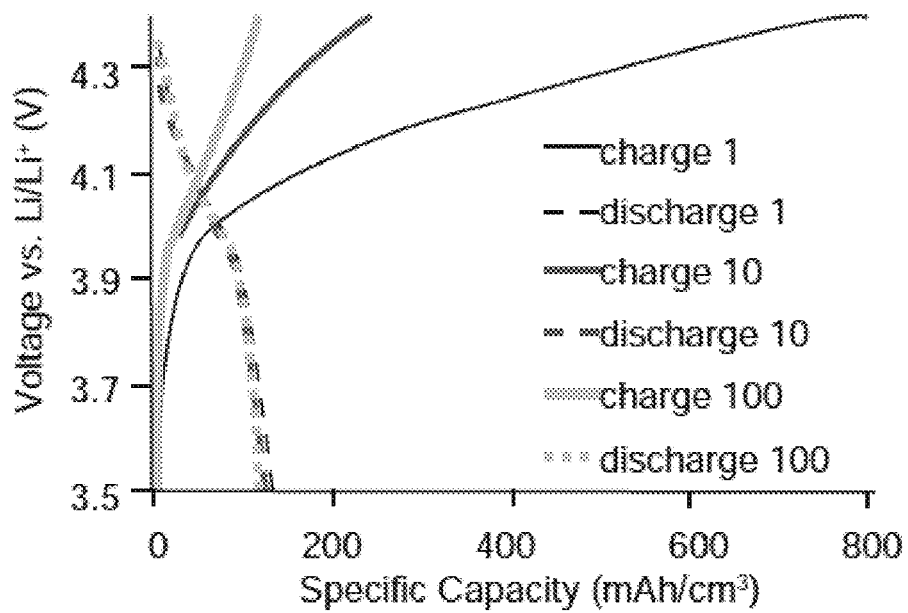
FIG. 4D shows a voltage-capacity curve of graphene-coated LMO thin films vs. lithium.
Figure 4E:
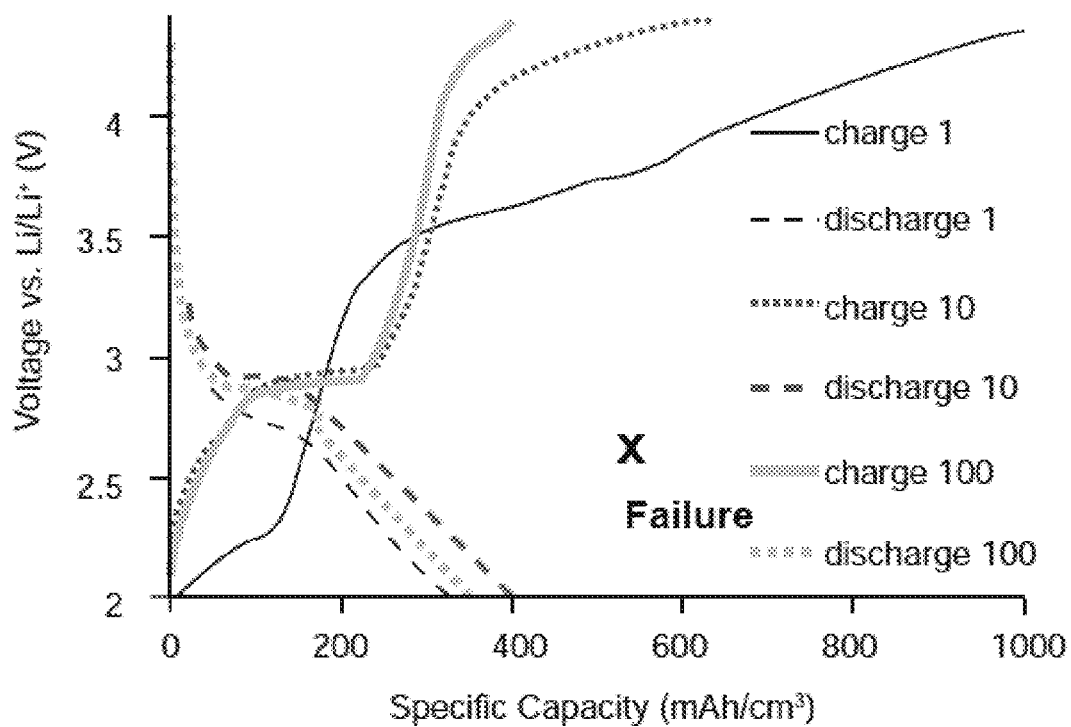
FIG. 4E shows a voltage-capacity curve of uncoated LMO thin films vs. graphite.
Figure 4F:
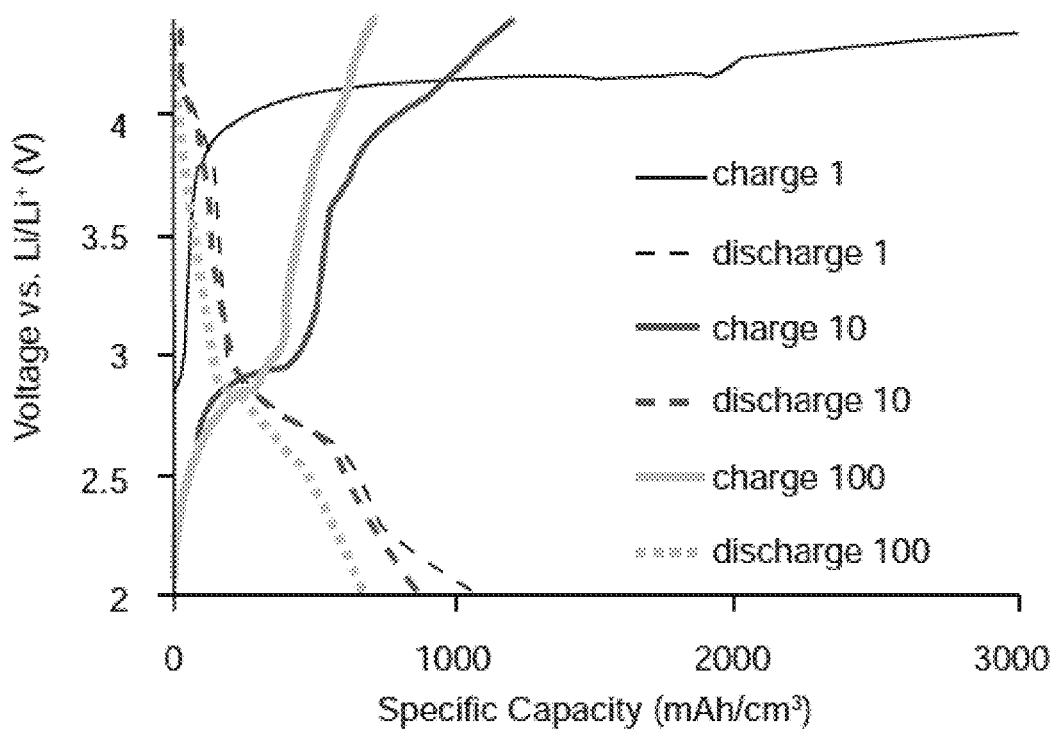
FIG. 4F shows a voltage-capacity curves of graphene-coated LMO thin films vs. graphite.

However, it should be noted that the metallic lithium anode can also cause failure since it is prone to dendrite formation following long-term cycling and consequent internal short-circuiting of the cell. Therefore, electrochemical evaluation of uncoated and graphene-coated LMO electrodes in full-cell geometries was undertaken to circumvent this problem. The voltage-capacity curves for uncoated and graphene-coated LMO thin films when cycled in a full-cell geometry with a graphite anode show a similar trend (FIGS. 4E, F). To minimize the effect of Mn contamination on the SEI of the graphite anode, the anode was pretreated prior to full-cell assembly with two lithiation/delithiation cycles[7,8] using a lithium half-cell. Specifically, the thin films were cycled in a wider range of voltage (2 to 4.4 V) in the full-cell geometry as opposed to half-cell geometry (3.5 to 4.4 V), which resulted in larger capacity utilization per unit area (FIG. 4).

Figure 3B:
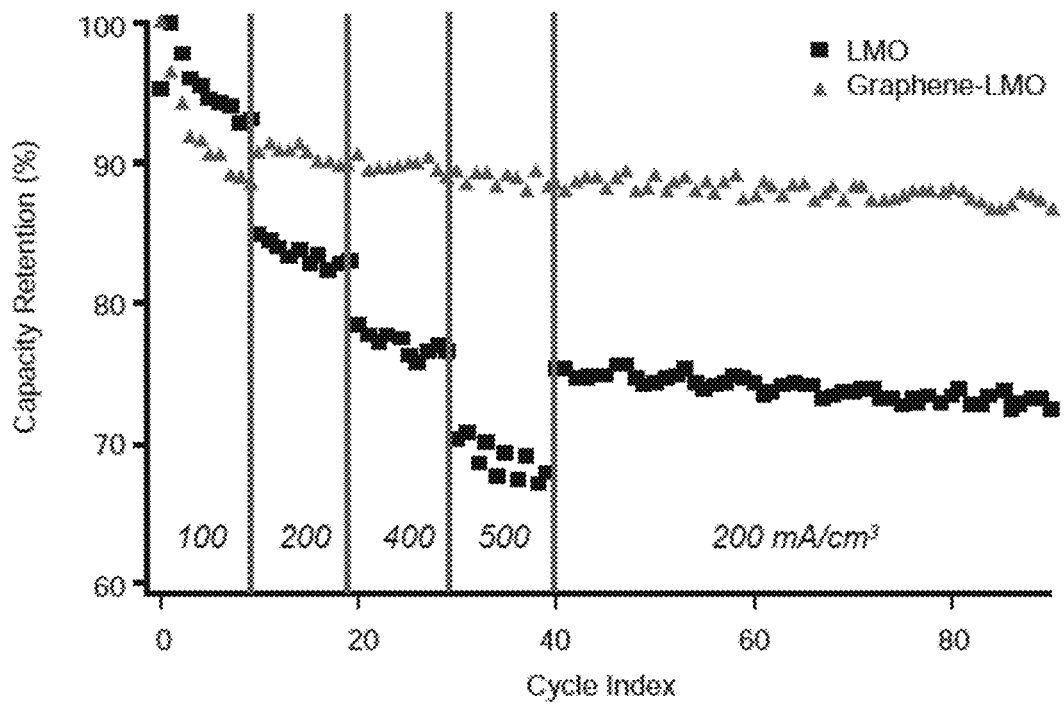
FIG. 3B shows capacity retention versus cycle number for uncoated and graphene-coated LMO cathodes in graphite/LMO full cells at various current rates (100-500 mA/cm$^3$).
Figure 4G:
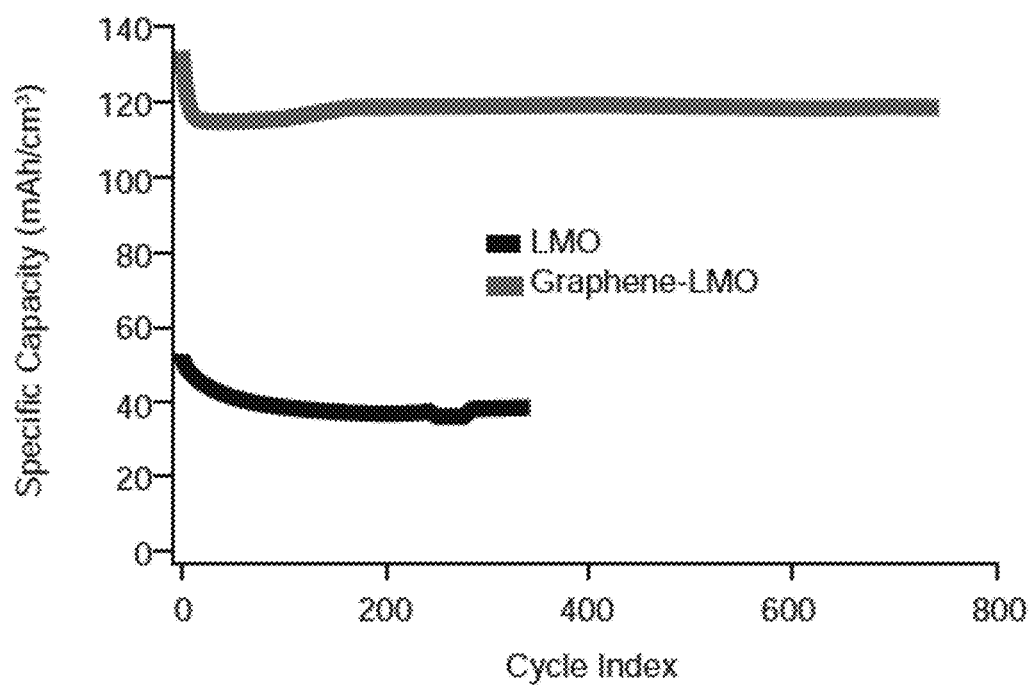
FIG. 4G shows volumetric capacity of LMO and graphene-coated LMO thin films vs. lithium.
Figure 4H:
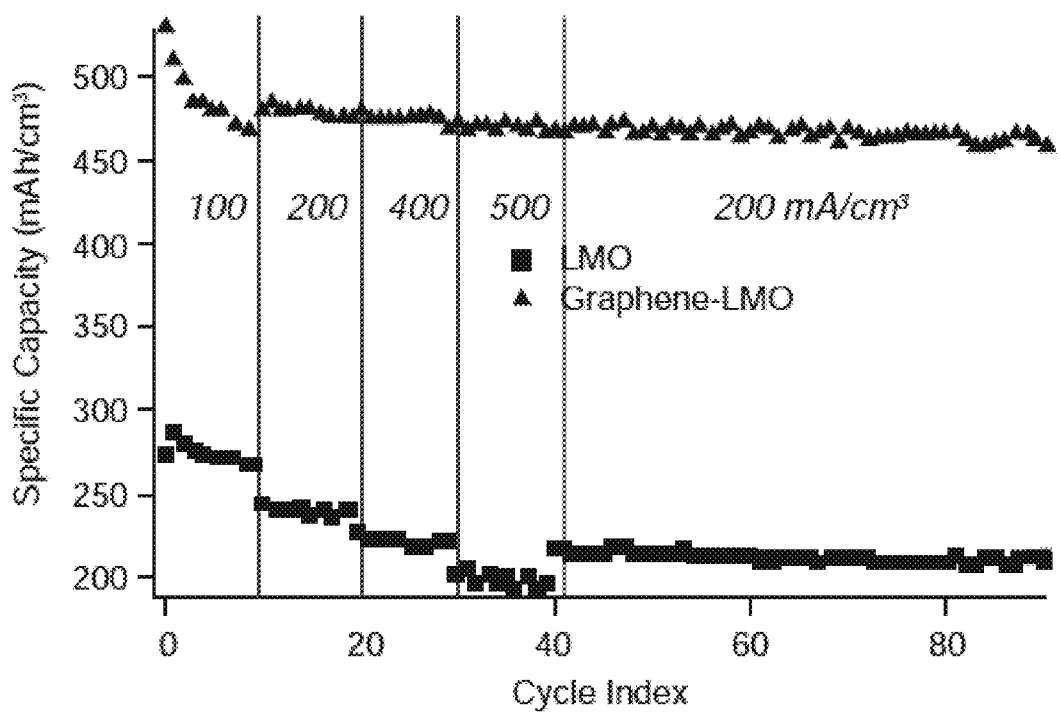
FIG. 4H shows volumetric capacity of LMO and graphene-coated LMO thin films vs. graphite.

The voltage profiles of the lithium half-cell and full-cell (FIGS. 4E, F) are consistent with lithium insertion into the LMO spinel structure at ~3 V, the profile of which is dependent on the composition of the sputtered LMO film, particularly the Li:Mn and Mn:O ratios, and the location and arrangement of the atoms within the spinel structure.[33,34] The reduction of $Mn^{4+}$ to $Mn^{3+}$ below 3 V is expected to exacerbate manganese dissolution for LMO cathodes. However, when cycled at 2.0 to 4.4 V, graphene-coated LMO cathodes have the advantage of increased capacity (additional lithiation at 3 V) without intensified manganese loss. Thus, higher capacity was observed when the cathodes were cycled at 2.0 to 4.4 V (FIG. 4H) in comparison with cathodes cycled at 3.5 to 4.4 V (FIG. 4G). Additionally, graphene has been shown to improve the capacity of cathodes such as $LiMn_2O_4$[26] and $LiFePO_4$[24] by providing conductive pathways, which may also contribute to the higher volumetric capacity shown in FIGS. 4G, H. FIG. 3b shows the cycling performance of uncoated and graphene-coated LMO versus graphite when cycled over the larger voltage range (2.0 to 4.4 V). This figure also shows the effect of varying the applied current on the capacity of these electrodes. The superior capacity delivered by the graphene-coated LMO films relative to uncoated LMO films highlights the significant impact of the graphene coating on electrochemical performance, particularly in improving the charge/discharge rate of the LMO cathode[26].

Characterization and Data Analysis: XPS Depth Profiling

Figure 5A:
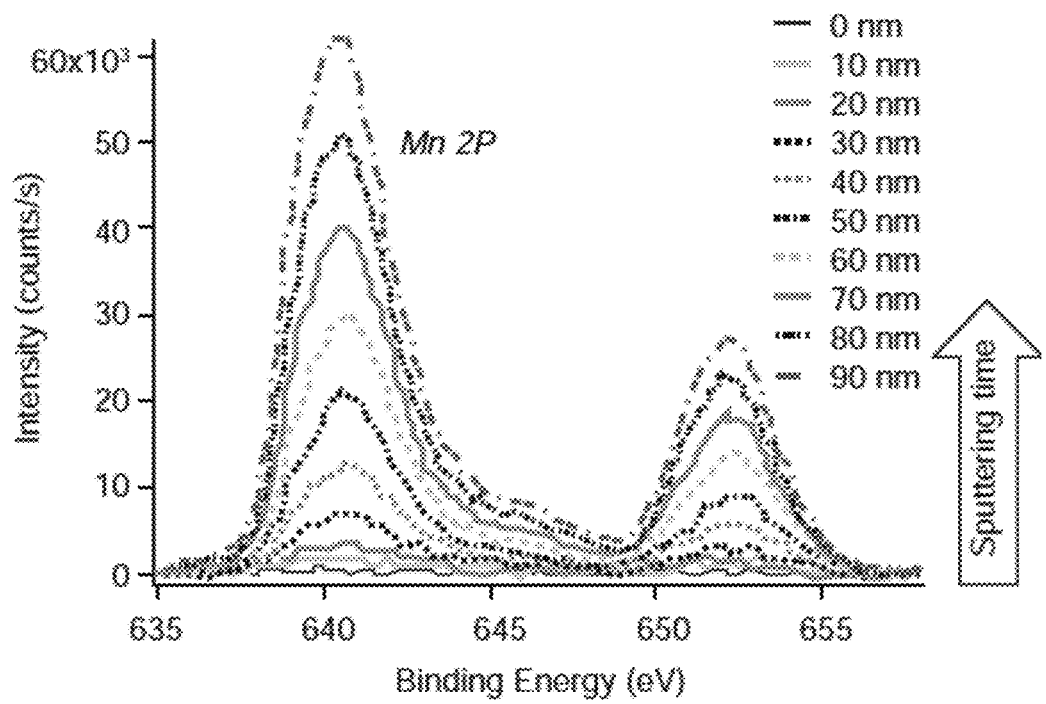
FIG. 5A shows XPS depth profiling of the Mn 2P peaks for graphene-coated LMO cathodes after 750 lithiation/delithiation cycles.
Figure 5B:
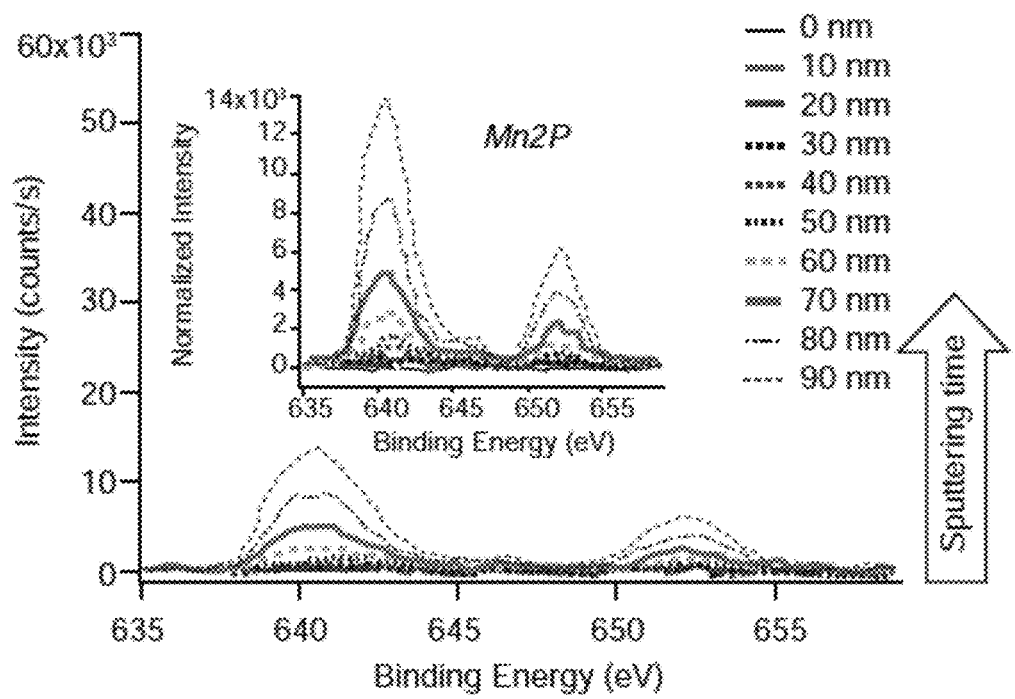
FIG. 5B shows XPS depth profiling of the Mn 2P peaks for uncoated LMO cathodes after 350 lithiation/delithiation cycles.
Figure 5C:
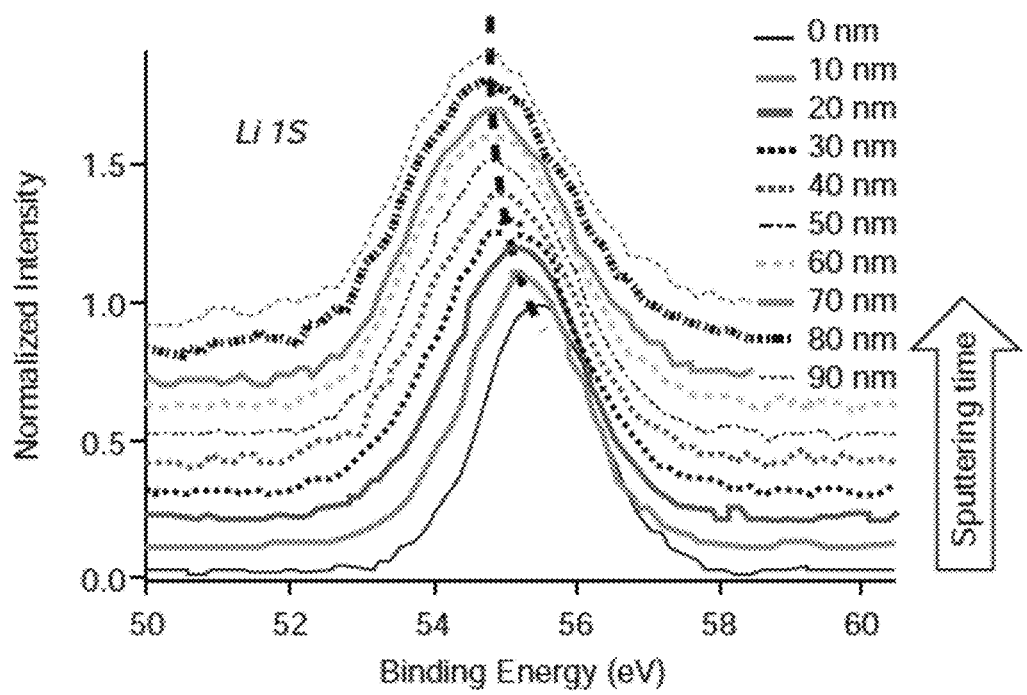
FIG. 5C shows normalized Li 1S peaks for graphene-coated LMO after 750 lithiation/delithiation cycles.
Figure 5D:
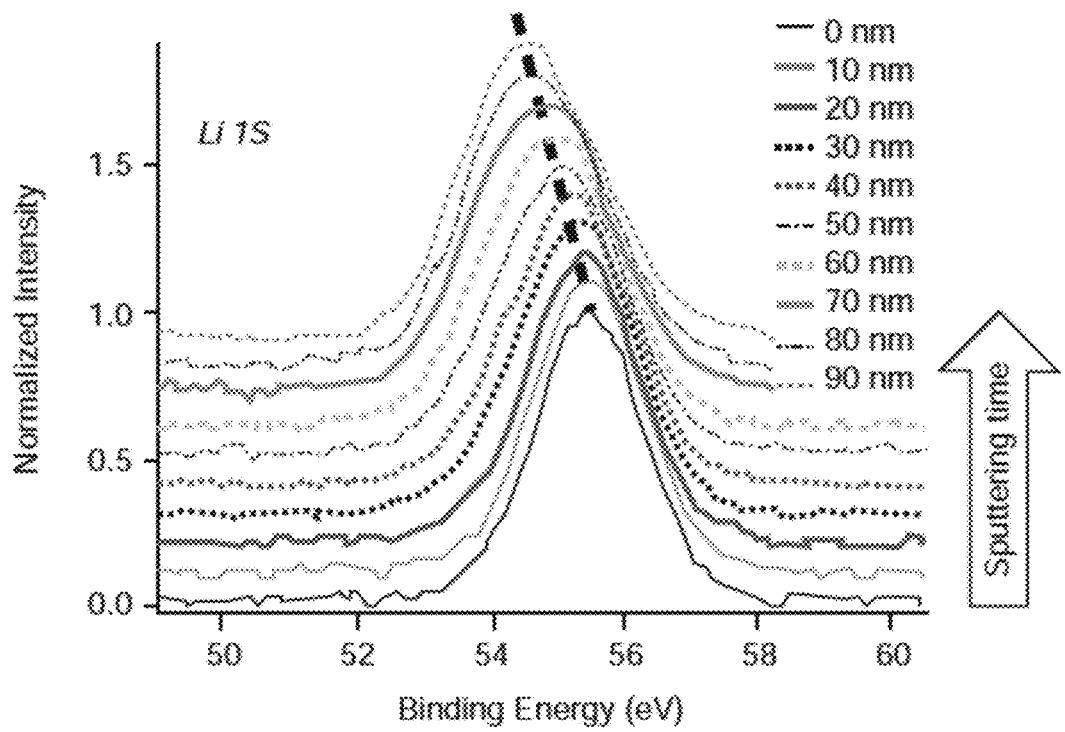
FIG. 5D shows normalized Li 15 peaks for uncoated LMO after 350 lithiation/delithiation cycles.

To measure the extent of manganese loss in the LMO thin films after electrochemical cycling, XPS depth profiling was performed. XPS samples were handled under anoxic conditions to preserve the SEI layer. FIG. 5A shows the intensity of the Mn 2p peak as a function of sputtering depth through the cycled graphene-coated LMO thin film. The graphene-coated LMO electrode that had been cycled 750 times (FIG. 5A) was significantly less depleted in manganese than an uncoated LMO electrode that had been cycled only 350 times (FIG. 5B). The Li 1s peak also shifts to lower binding energies from the surface to the bulk of the sample (FIGS. 5C, D). This shift is attributed to the loss of manganese that causes a change in the electronegativity of the $Mn_xO_y^{-\delta}$ framework in the LMO structure[35]. FIG. 5E, F show the variation of the Mn 2p peak intensity as a function of surface depth for cycled cathodes in half-cells (3.5 to 4.4 V) and full-cells (2.0 to 4.4 V), respectively. These results demonstrate that depletion of manganese is significantly greater in an uncoated cathode when cycled in a full cell (versus a graphite anode) over the larger voltage window (FIG. 5F).

Figure 6A:
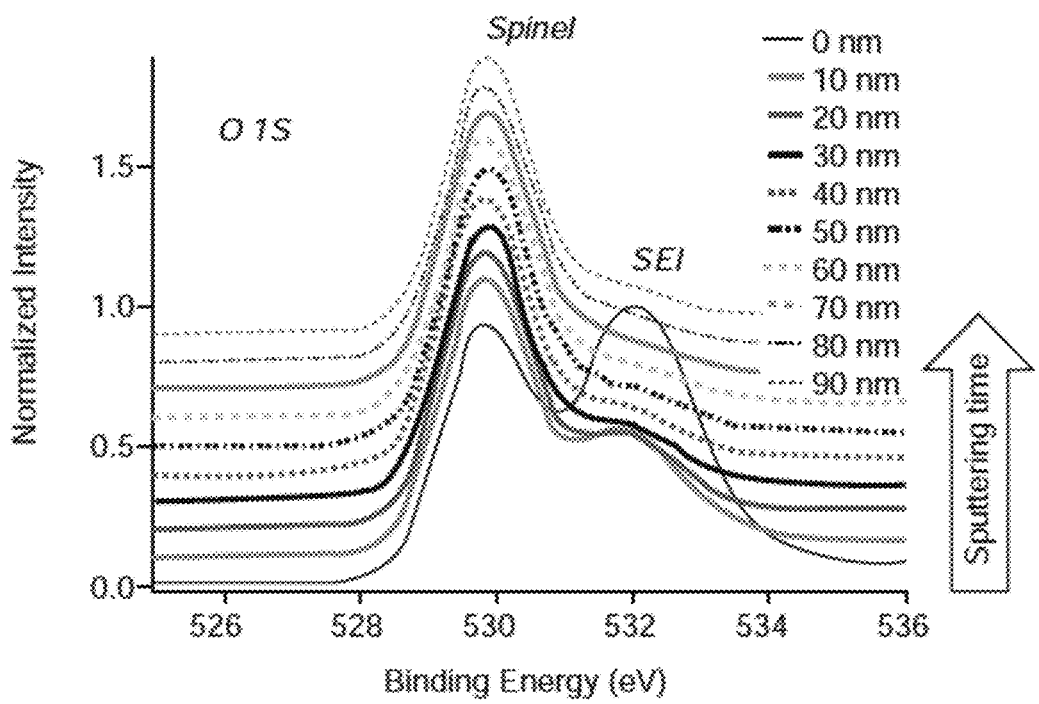
FIG. 6A shows the effect of graphene on SEI formation of LMO cathodes by XPS depth profiles of O 1S peak for graphene-coated LMO after cycling.
Figure 6B:
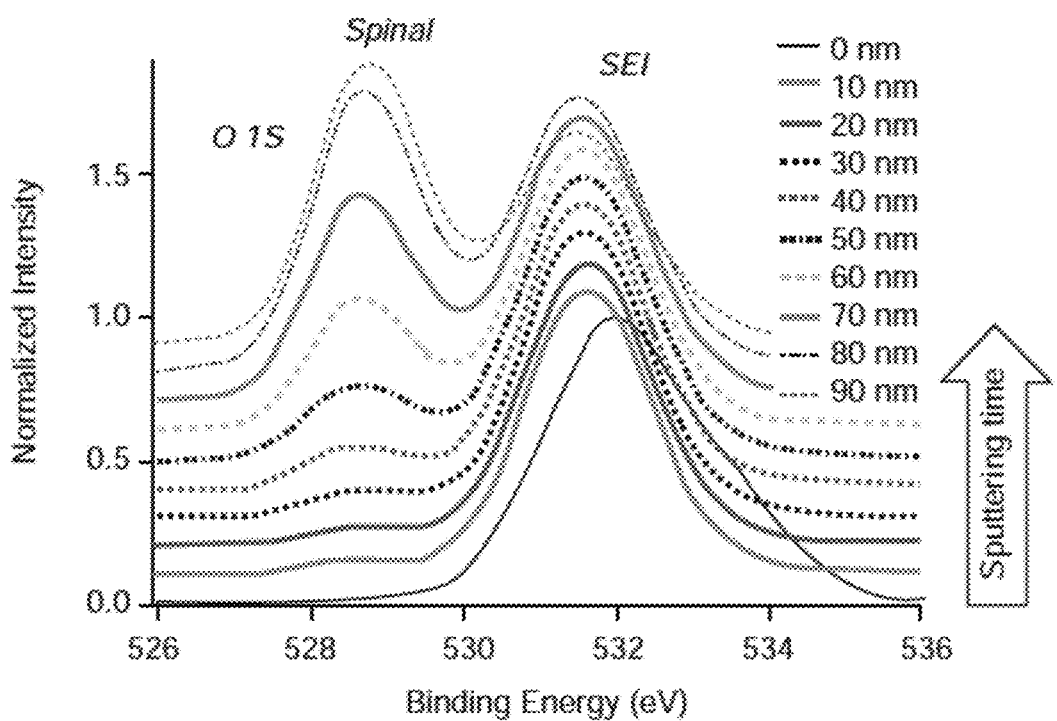
FIG. 6B shows the effect of graphene on SEI formation of LMO cathodes by XPS depth profiles of O 1S peak for uncoated LMO after cycling.

The XPS O 1s peaks allow the effect of the graphene coating on electrode-electrolyte interactions to be probed (FIGS. 6A, B). The peak at ~529 eV is attributed to the metal-oxygen bonds in the LMO spinel structure, while the peak at ~532 eV is attributed to carbon-oxygen bonds in the SEI layer as a result of surface reactions with the electrolyte. For the graphene-coated LMO cathode, the peak at 532 eV saturates at ~10 nm depth, whereas, in the uncoated LMO film, this peak continues to increase in magnitude. We attribute this result to the formation of a stable, thin SEI layer on the graphene coated LMO cathode, which occurs without affecting the bulk of the LMO sample. On the other hand, the uncoated LMO surface reacts more strongly with the electrolyte, particularly at higher potentials, resulting in greater manganese depletion and SEI buildup.

XPS measurements were conducted in an oxygen-free manner as explained above with a Thermo Scientific ESCALAB 250Xi system. Al Kα radiation with a spot size of 500 μm was used for measurement. An $Ar^+$ cluster ion gun was used for depth profiling with 30 s etch time at 3 keV. The intensities were normalized with the intensity of the Li 1s peak in the substrate to emphasize the differences between the graphene-coated and uncoated samples.

Characterization and Data Analysis: XRD

GI-XRD was measured with a Rigaku ATX-G thin-film diffraction system using a 18 kW copper X-ray rotating anode source. To calculate the lattice parameters, a linear background was subtracted from the individual peaks using Jade software. To ensure that the experiments only highlight the effect of graphene and are not affected by impurity content, we have used the samples from the same sputtering/annealing batch to compare their electrochemical characterization before and after graphene transfer. We have also verified the lattice parameter of each sample using XRD. Since the graphene transferred on LMO does not chemically react with the LMO substrate and is mainly single or double layer, the XRD spectrum of graphene-coated LMO is the same as the starting LMO substrate.

Characterization and Data Analysis: Raman

The graphene/LMO samples were characterized by SEM and Raman spectroscopy to determine the extent of graphene coverage (>90% coverage was estimated by low magnification SEM images). Multiple spots were chosen randomly on each sample and measured by Raman to verify the graphene coverage using the graphene 2D peak. An SEM image and Raman spectrum of the graphene-coated LMO surface are shown in FIGS. 2C, D (graphene is indicated by the arrows).

Ex situ Raman measurements were performed using a Renishaw inVia Confocal Raman Microscope. A 514 nm, 13.8 mW laser was used for the measurements at a 50× magnification (laser spot size ~2-3 μm in diameter) with accumulation times of up to 60 sec to resolve the low intensity peaks.

Characterization and Data Analysis: Scanning Transmission Electron Microscopy

The nature of the SEI layer is of importance in protecting the LMO surface and minimizing manganese dissolution in the electrolyte. In particular, a thin and dense SEI layer is ideal since it limits access of the electrolyte to the LMO surface and thus helps prevent manganese dissolution, while concurrently minimizing the diffusion barrier for lithium ion transport.[36]

All samples were charged/discharged for 100 cycles in full cells with graphite anodes (2 to 4.4 V). The cross-sectional STEM and HRTEM samples were prepared by focused ion beam (FIB) milling (~100 nm of nickel was deposited on the sample prior to FIB to protect the SEI layer).

Figure 6C:
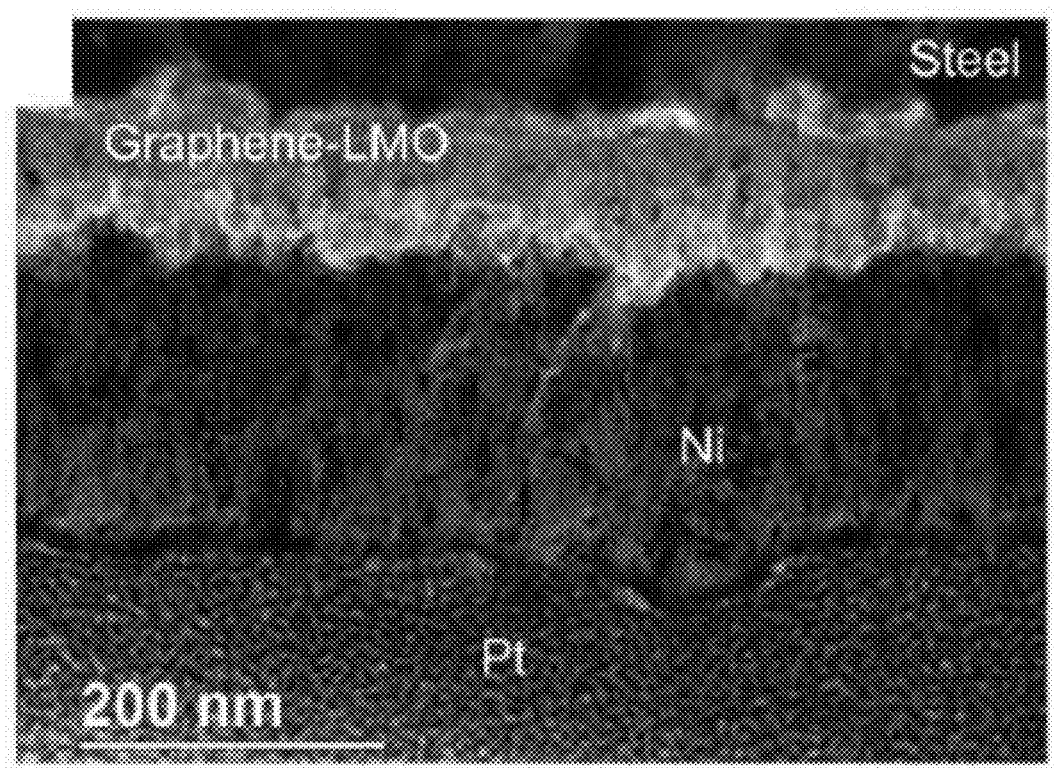
FIG. 6C shows bright-field cross-sectional STEM images of graphene-coated LMO after cycling.
Figure 6D:
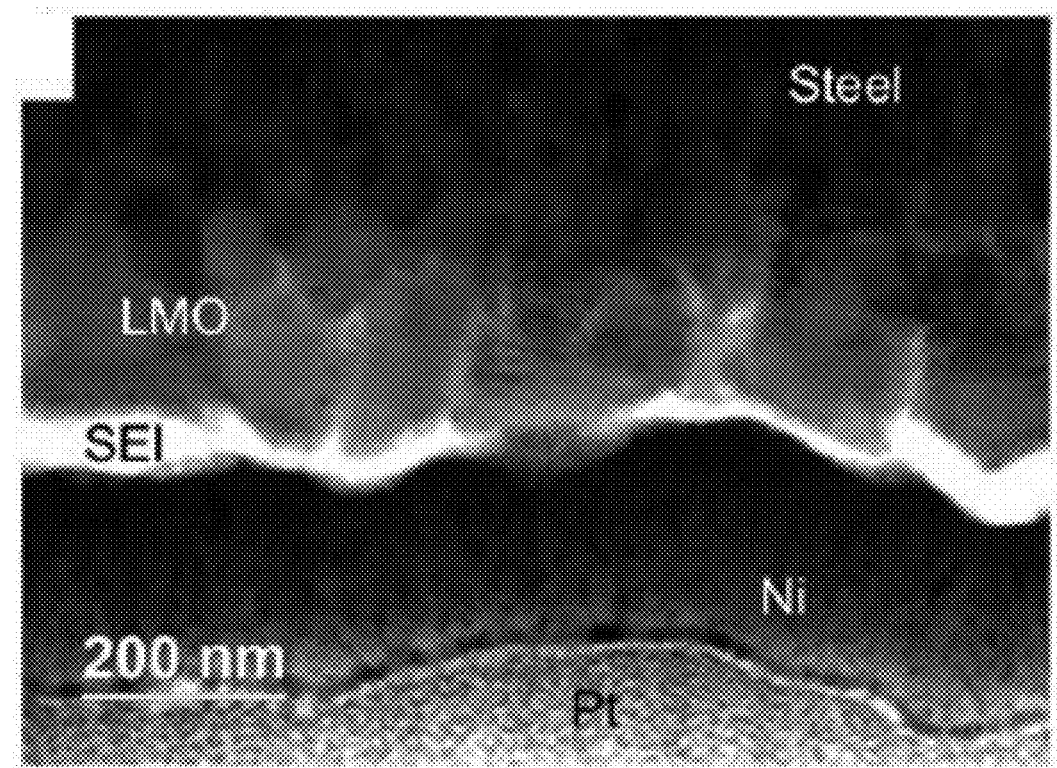
FIG. 6D shows bright-field cross-sectional STEM images of uncoated LMO after cycling.
Figure 6E:
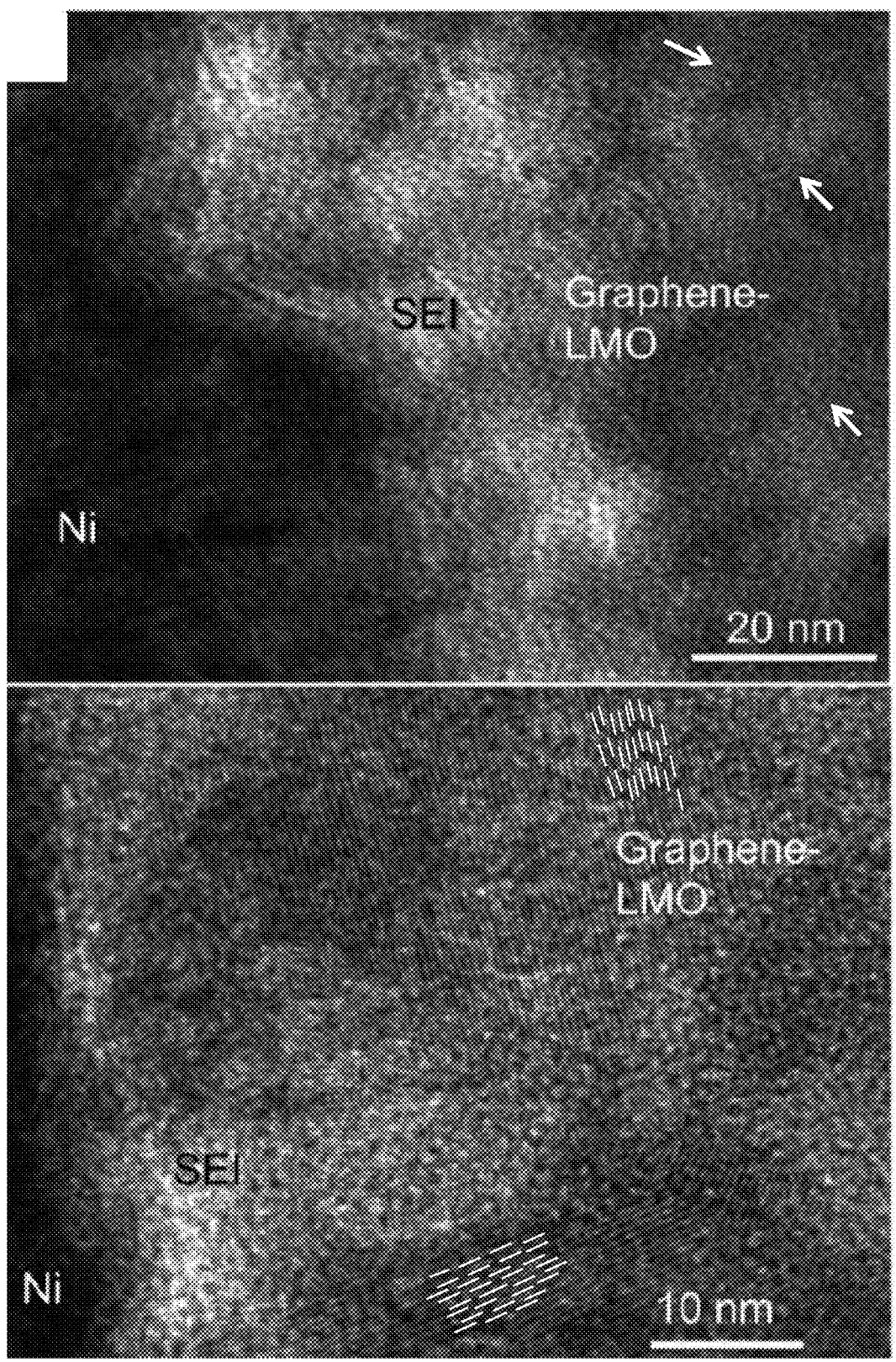
FIG. 6E shows cross-sectional HRTEM images of graphene-coated LMO after cycling.
Figure 6F:
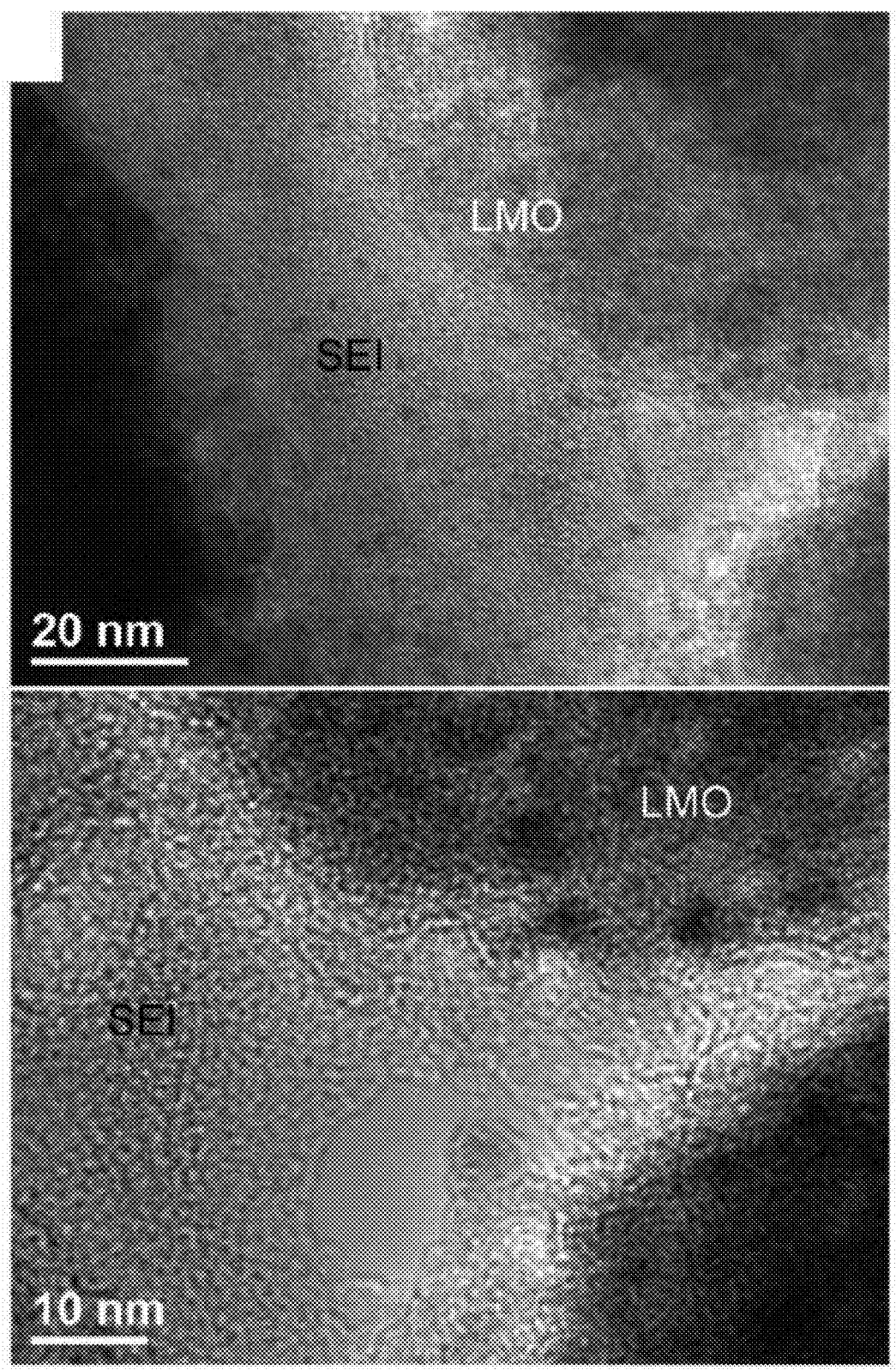
FIG. 6F shows cross-sectional HRTEM images of uncoated LMO after cycling.
Figure 7A:
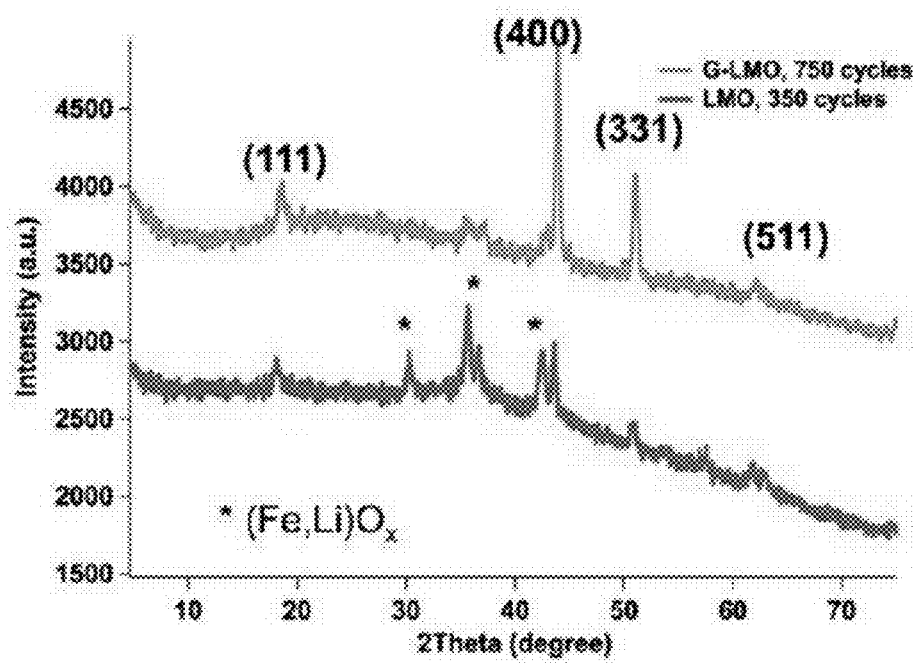
FIG. 7A shows a grazing incidence x-ray diffraction measurement of the LMO and graphene-coated LMO films after cycling.
Figure 7B:
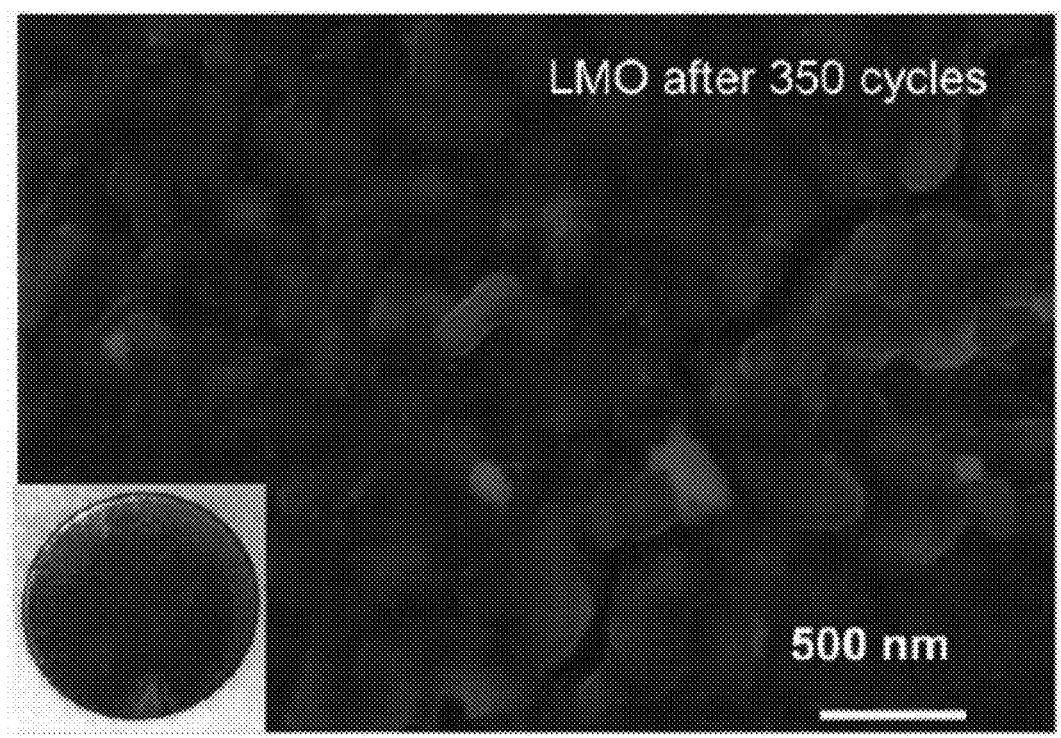
FIG. 7B shows an SEM image of the LMO cathode after 350 cycles.
Figure 7C:
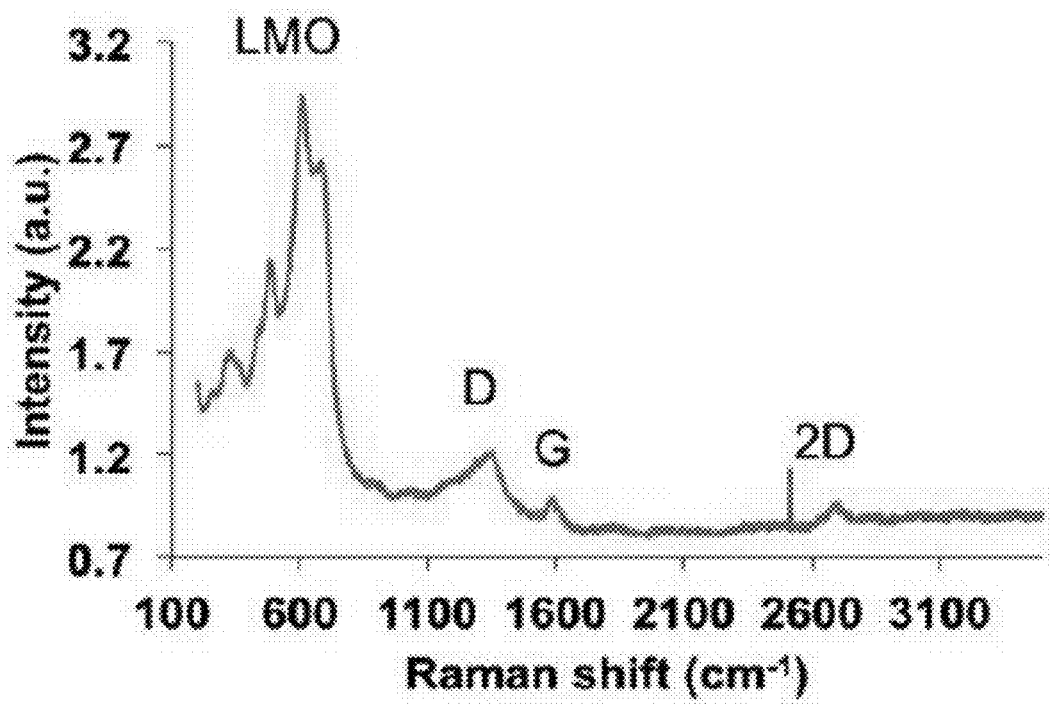
FIG. 7C shows a Raman spectrum of graphene-coated LMO after 750 cycles. The sharp peak to the left of the 2D peak (~2400 cm$^{-1}$) is due to ambient nitrogen.
Figure 7D:
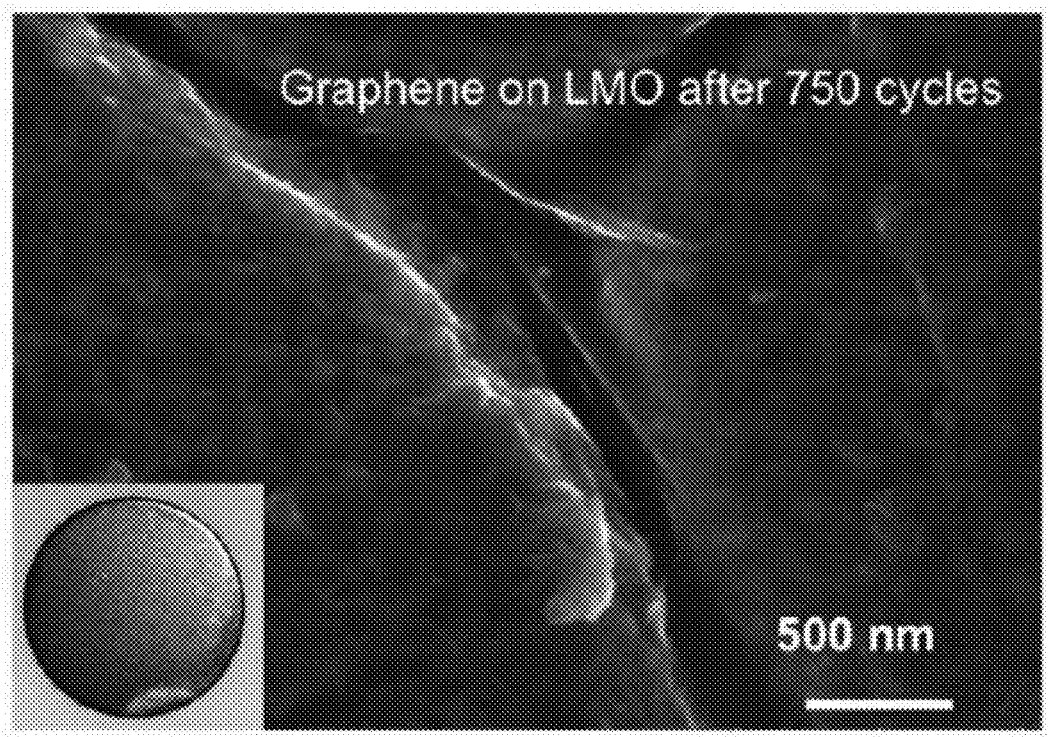
FIG. 7D shows an SEM image of the graphene-coated LMO after 750 cycles.

Here, the SEI layer can be observed in the cross-sectional scanning transmission electron microscopy (STEM) images of these samples (FIGS. 6C, D). The graphene-coated LMO thin film remains dense and retains its original thickness (FIG. 6C). On the other hand, the uncoated LMO thin film has a thicker SEI layer (FIG. 6D). Although the ultra-thin SEI layer on the graphene-coated LMO is not easily observed in the STEM images, it can be observed by high-resolution transmission electron microscopy (HRTEM) (FIG. 6E), where the lattice planes of the LMO crystallites are visible (select locations are highlighted by arrows and dashed lines). In contrast, the HRTEM image of cycled, uncoated LMO shows amorphous character (FIG. 6F), which is confirmed by grazing incidence X-ray diffraction (GI-XRD) (FIG. 7A). FIG. 7 further shows SEM images and Raman spectroscopy data of a cycled graphene-coated LMO cathode, in which the graphene can still be detected and identified after 750 cycles (FIG. 7). Since lithiation is known to introduce defects in graphene[20], it is not surprising that the intensity of the Raman D band increases relative to pristine graphene following cycling (2d). Nevertheless, the fact that single-layer graphene remains largely intact following 750 charge/discharge cycles validates the robustness and integrity of graphene coatings for battery cathode applications. The thin film samples show the discoloration of uncoated LMO after 350 cycles while the graphene-coated LMO retains its original color.

Bright-field scanning transmission electron microscopy (STEM) imaging of the samples was performed using a STEM (Hitachi HD-2300A) operated at 200 kV with a spatial resolution of <0.23 nm. High resolution transmission electron microscopy (HRTEM) imaging and electron diffraction were conducted with a JEOL-2100F FasTEM at 200 kV. Cross-sectional samples for STEM and HRTEM were prepared by in situ lift-out with a FEI Helios Nanolab 600 dual beam FIB/SEM instrument equipped with an Omniprobe 200 micromanipulator. The area of interest was protected by ~100 nm of nickel, which was deposited ex situ via electron beam evaporation followed by in situ platinum deposition and rough machining with a 30 keV gallium ion beam. To minimize beam damage, the ion beam energy was lowered to 5 keV and 2 keV for final thinning and cleaning of the TEM lamella, respectively.

In Silico Modeling of the Cathode

Two mechanisms underlie the mitigation of manganese loss with graphene surface modification. First, the combination of the graphene layer and well-defined, thin SEI layer acts as a barrier for manganese ion migration and dissolution into the electrolyte, while concurrently allowing rapid lithiation/delithiation. Second, the interaction between the graphene coating and the LMO surface suppresses the 2 $Mn^{3+}$ →$Mn^{4+}$+$Mn^{2+}$ disproportionation reaction and subsequent release of dissolved $Mn^{2+}$ ions into the electrolyte. Theoretical calculations were performed to further investigate these two mechanisms, as described below.

Figure 8A:
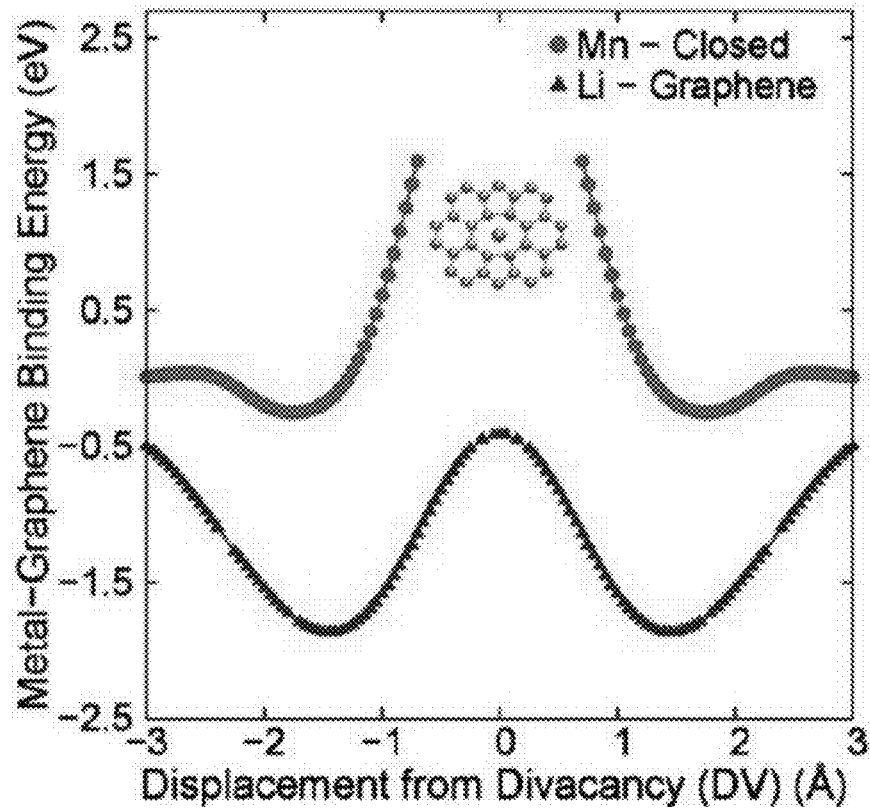
FIG. 8A illustrates a diffusion energy barrier through DV(5-8-5) in graphene for Mn approaching the graphene sheet. The inset shows the structure of the DV in the closed configuration with Mn near the graphene sheet (0.6 Å away from graphene).
Figure 8B:
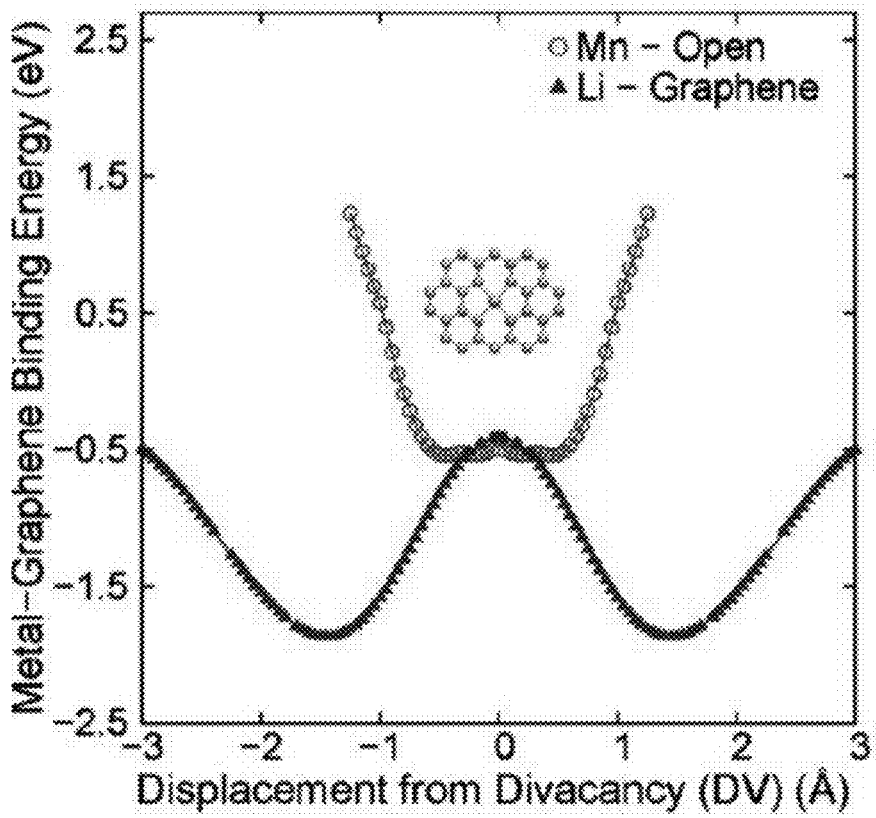
FIG. 8B illustrates a Mn potential energy profile for Mn within the DV. The inset shows the structure of the DV in the open configuration. The insets are truncations near the DV of the Kékule 156-atom graphene flake model. For reference, the calculated binding energies for Li and Mn for the stoichiometric (001) $LiMn_2O_4$ surface with respect to the vacuum are 4.9 and 8.9 eV, respectively.

We first investigate the hypothesis of graphene acting as a physical barrier to Mn diffusion, while allowing the diffusion of Li. We focus primarily on the comparison between the diffusion of Li and Mn through a di-vacancy (DV) graphene defect as explained in the supporting information section. In particular, a DFT study of Li and Mn atoms passing through a graphene DV defect was conducted. The principal result is that a Li atom can pass through the DV with no apparent barrier (i.e., the energy is lower than the vacuum state), whereas a Mn atom encounters a large energy barrier. The potential energy profile of a Mn atom approaching a DV in a graphene sheet from a distance >3 Å is shown in 8a. In this case the DV has an eight-member closed ring configuration that is repulsive to Mn as the atom approaches the DV. In addition, we found a bound state where Mn forms chemical bonds with the four nearest carbon atoms in the defect (FIG. 8B). To escape the well formed by the bound state, the C—Mn bonds must be broken. In the Mn bound state, the DV is in an open configuration (two C—C bonds from the ring lengthen to 2.50 Å) to accommodate the Mn atom while in the defect. Although we were not able to locate the transition state for Mn migration to the bound state (because of the change in spin state required due the dangling bonds of the open DV configuration), it is clear that Mn will experience a higher energy barrier to cross the DV than Li. In contrast, Li does not induce C—C bond breaking, and it is not bound in the plane of the defect.

The above calculations do not consider the interaction between graphene and the LMO substrate. Furthermore, larger graphene defects will not block either Mn or Li, which explains why the dissolution rate is nonzero. However, the reaction of LMO surfaces with graphene can result in significant structural and electronic changes, which we investigate here by performing density functional theory (DFT)+U calculations.

Figure 9C:
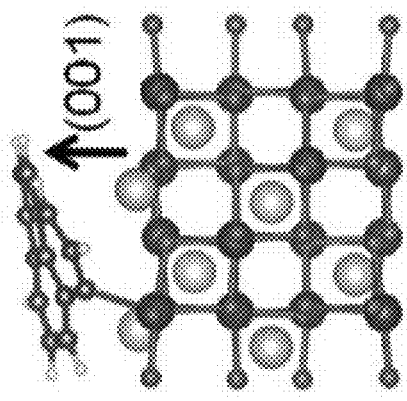
FIG. 9C illustrates a LMO (001) surface in thin film LMO electrodes for a graphene patch adsorbed parallel (0°) relative to the surface.
Figure 9B:
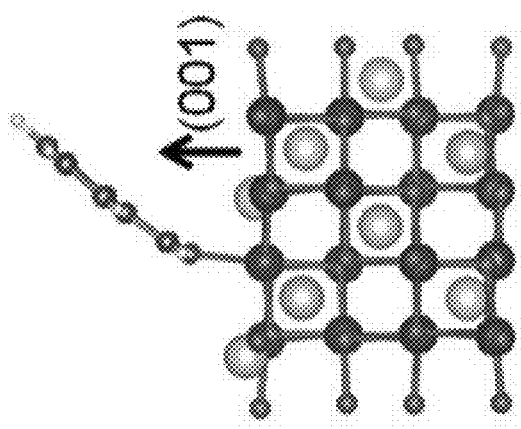
FIG. 9B illustrates a LMO (001) surface in thin film LMO electrodes for a graphene patch adsorbed at 45° relative to the surface.
Figure 9A:
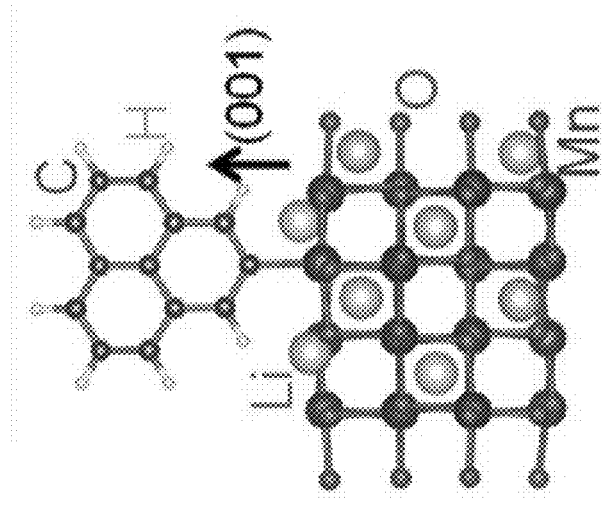
FIG. 9A illustrates a LMO (001) surface in thin film LMO electrodes for a graphene patch adsorbed perpendicular (90°) to the surface.

Previous DFT+U calculations have shown that among the lowest energy surfaces of LMO are (001)[37-39] and reconstructed-(111).[40] The Mn atoms on the (001) surface are more prone to Mn dissolution since the reconstructed-(111) surface moves the surface Mn to the bulk layers.[40] Our calculations indicate that the oxidation state of the Mn in the (001) surface is +3 as reported previously,[37,39] which supports the idea that the Mn disproportionation reaction is more likely to initiate from the (001) surface. We find that when a graphene patch (GP) with a reactive edge (i.e., with a C atom with unsaturated bonds) is placed above the (001) surface of LMO, it energetically prefers to adsorb on top of surface Mn atoms (Table 2), and the GP becomes chemisorbed (Table 2) regardless of its orientation or the angle it makes with the (001) LMO surface (FIG. 9).

TABLE 1

The calculated DFT energies of various sites for 90° graphene/LMO with respect to the lowest energy configuration achieved.

| Graphene Edge Sites | Energy Differences (eV) |
|---|---|
| Mn—C bond length >3 Å | +1.309 |
| Above Li atom | +1.001 |
| Above O atom | +0.539 |
| Above Mn Atom (lowest energy position: reference) | 0 |

TABLE 2

The calculated binding energies of LMO and graphene systems.

| Chemical Structures | Binding Energy* (eV) |
|---|---|
| 0° graphene/$Li_8Mn_{16}O_{32}$ | −1.236 |
| 45° graphene/$Li_8Mn_{16}O_{32}$ | −1.349 |
| 90° graphene/$Li_8Mn_{16}O_{32}$ | −1.769 |
| 90° graphene/$Li_{16}Mn_{32}O_{64}$ (long) | −1.135 |
| 90° graphene/$Li_{16}Mn_{32}O_{64}$ (wide) | −1.553 |

*Binding Energy = $E_0$[LMO/GP] − $E_0$[LMO] − $E_0$[GP]

Figure 10A:
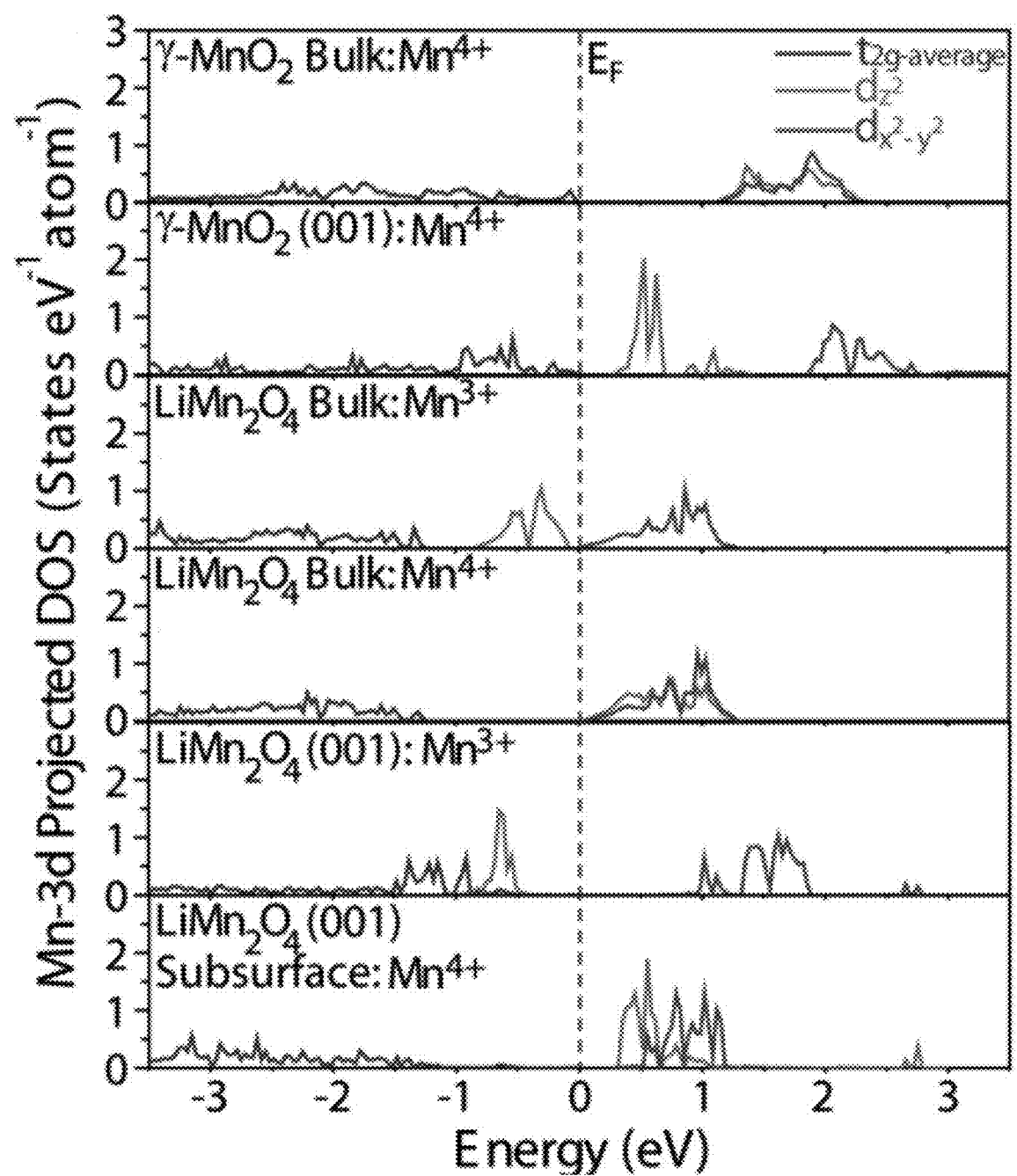
FIG. 10A illustrates the effect of a graphene patch (GP) absorbed on LMO (001) from DFT+U calculations. The majority-spin channel of the Mn 3d projected density of states (DOS) is shown for: a) bulk λ-$MnO_2$ ($Mn^{4+}$), the λ-$MnO_2$ surface ($Mn^{4+}$), LMO bulk ($Mn^{3+}$ and $Mn^{4+}$), and the (001) LMO surface ($Mn^{3+}$) and subsurface ($Mn^{4+}$). The Fermi level is set as zero in the DOS plots.

In FIG. 10A, we show the electronic density of states (DOS) of various bulk and surface Mn oxides in 3+ and 4+ oxidation states; namely, bulk λ-$MnO_2$ ($Mn^{4+}$), λ-$MnO_2$ (001) surface ($Mn^{4+}$), bulk $LiMn_2O_4$ ($Mn^{3+}$ and $Mn^{4+}$), and the (001) LMO surface ($Mn^{3+}$) and subsurface Mn ($Mn^{4+}$). The Mn ions in bulk λ-$MnO_2$, λ-$MnO_2$ (001) surface, and some of the Mn in bulk LMO have half-filled $t_{2g}$ and empty $e_g$ bands, consistent with three valence electrons or $Mn^{4+}$ characteristics. For Mn in bulk LMO and on the (001) LMO surface, we see that the $d_{z^2}$ band is now occupied along with the $t_{2g}$ states, indicating a $Mn^{3+}$ oxidation state. For these cases, the $e_g$ band splits due to the Jahn-Teller distortion for bulk LMO ($Mn^{3+}$), and due to a combination of the Jahn-Teller distortion and surface symmetry breaking for the (001) surface $Mn^{3+}$. The subsurface Mn below the (001) surface, on the other hand, has an oxidation state of +4.

Figure 10B:
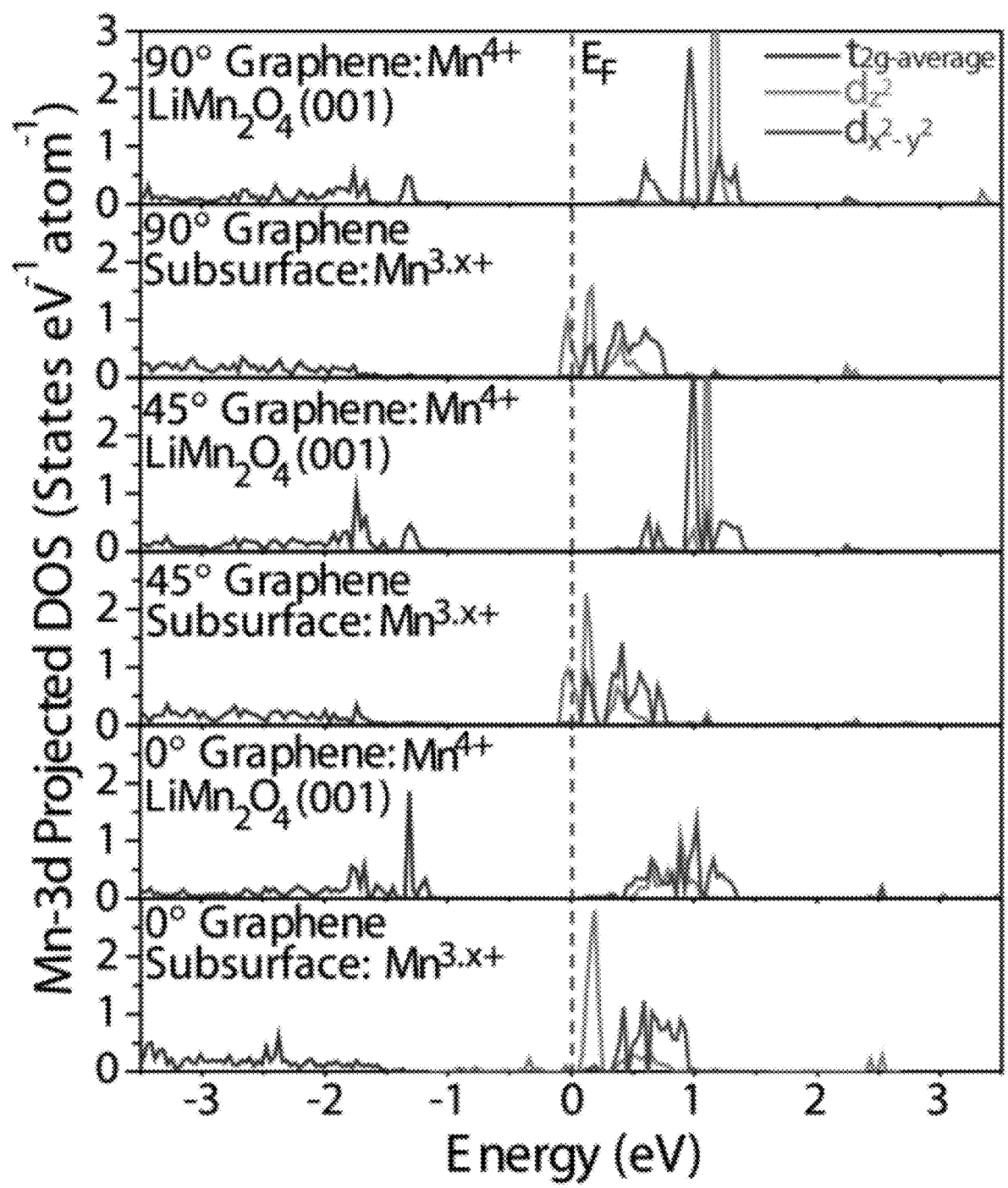
FIG. 10B illustrates the effect of the 0/45/90° graphene bound to (001) LMO surface ($Mn^{4+}$) and subsurface ($Mn^{3.x+, x\sim 0.75}$). The Fermi level is set as zero in the DOS plots.
Figure 11C:
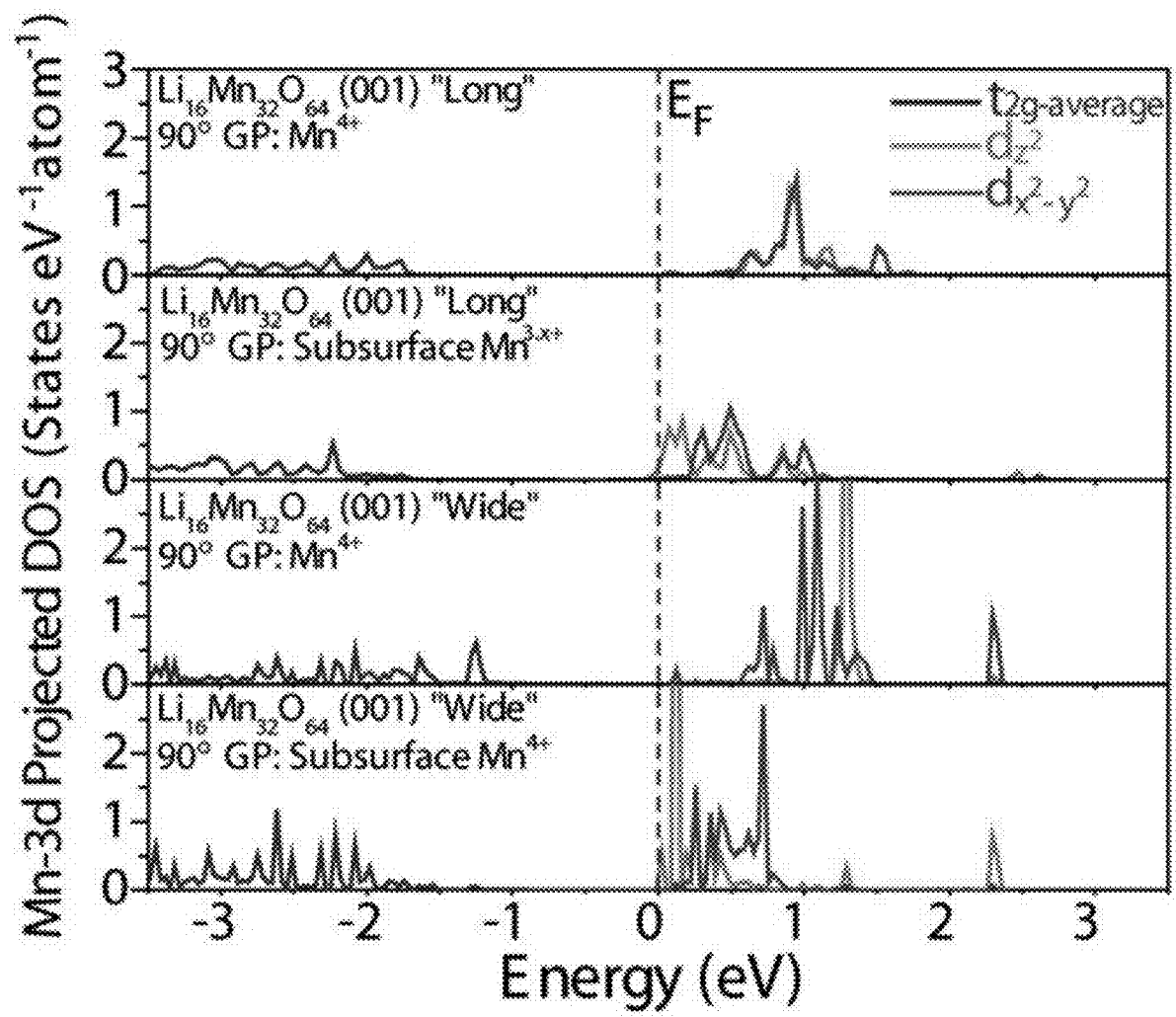
FIG. 11C shows the majority-spin channel of the Mn 3d projected density of states (DOS) of the 90° GP/$Li_{16}Mn_{32}O_{64}$ (001) surface and the Mn subsurface, where the oxidation states of the Mn atoms are found to be +4.
Figure 12:
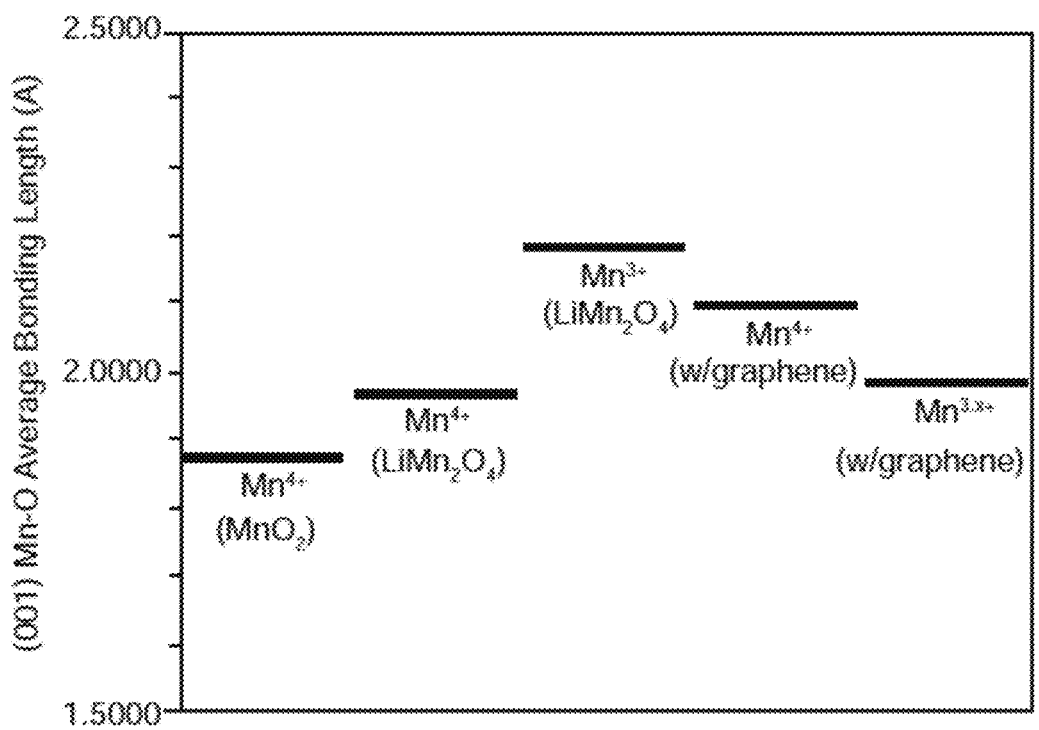
FIG. 12 shows the Mn—O average bond length: $Mn^{3+}$ changes its valence to $Mn^{4+}$ when the graphene sheet is present, and the average Mn—O bond length in z-direction is reduced. In comparison, $Mn^{4+}$ atoms in the subsurface change their valence to $Mn^{3.x+}$, and the average Mn—O bond length is slightly increased from $Mn^{4+}$.

Our DOS results show that we can differentiate between $Mn^{3+}$ and $Mn^{4+}$ in bare LMO surfaces, and thus we next examine the effect of the chemically bonded GP on the electronic structure of the (001) surface Mn as well as the subsurface Mn atoms (FIG. 10B). While all surface Mn atoms have an oxidation state of +3 without the GP in FIG. 10A, we consistently find in FIG. 10B that the (001) Mn atom that chemically bonds with graphene adopts an electron configuration that has a clear +4 character with an empty $e_g$ band for any GP/LMO orientation. As the Mn atom on the (001) surface reacts with the GP and changes its oxidation state to +4, the average oxidation state of subsurface $Mn^{4+}$ atoms slightly decreases to preserve the charge balance (see FIG. 11 for the effect of LMO film thickness). Analyzing the (001) LMO surface Mn—O bond distance, we find that the Jahn-Teller distortion is also suppressed as the oxidation state of surface Mn shifts to $Mn^{4+}$ in the presence of the GP (FIG. 12). Therefore, chemical bonding between graphene and LMO on the (001) surfaces provides a mechanism that electronically and structurally modifies the LMO (001) surfaces, and subsequently stabilizes them against $Mn^{3+}$ dissociation and the Jahn-Teller distortion by converting surface $Mn^{3+}$ to $Mn^{4+}$.

Figure 13:
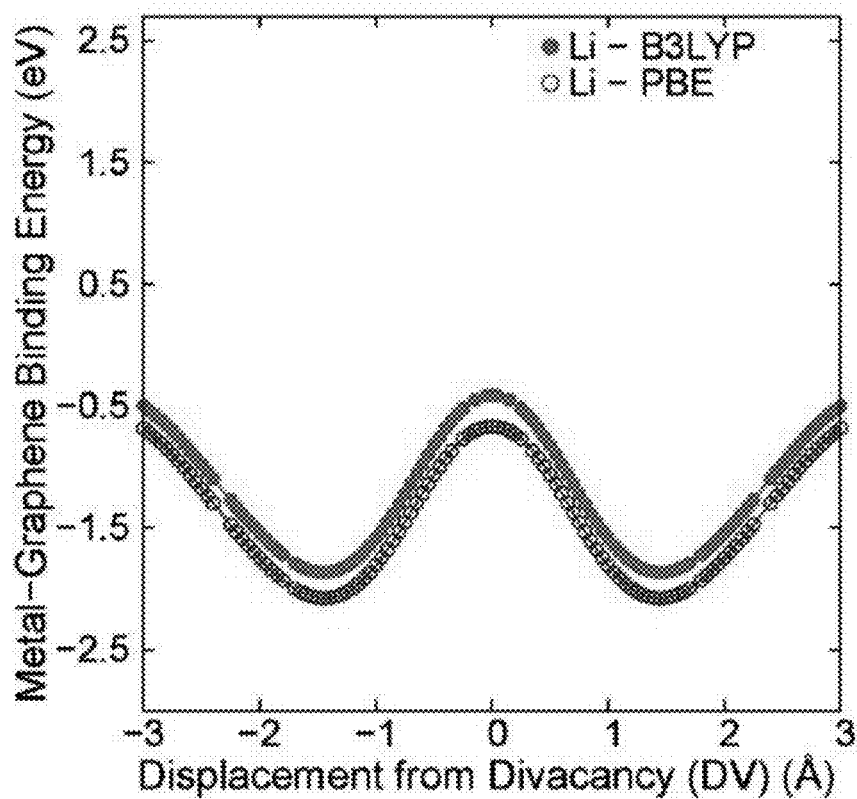
FIG. 13 shows the metal-graphene binding energy (eV) versus displacement from divacancy (Å).

The defect model was constructed by geometry optimization of a di-vacancy created in the center of a relaxed, pristine Kékule 158-atom graphene flake. The resulting 156-atom finite model[41] consisting of 128C and 28H was constrained by fixing terminal hydrogen atoms in order to preserve the graphene crystal lattice constant. In addition, the four carbon atoms in the DV nearest the metal were constrained to stay in the plane of the graphene, defined by the fixed terminal hydrogen atoms, in order to prevent the entire graphene sheet from deflecting away from the approaching metal atom. Our defect model was investigated with DFT calculations performed with the Gaussian 09 package[42] using the B3LYP hybrid functional[43,44] with a generalized (5d,7f) 6-31G* basis set for C, Li, and H atoms and the LANL2DZ effective core potential and basis set for the Mn atom. All integrals were calculated on an ultrafine grid. After each geometry optimization was performed, the wave function was checked for instability (stable=opt) and re-optimized as necessary. A DFT calculation was performed using the PBE[45] functional and the same basis set as a reference, which gave a very similar result (see FIG. 13. Calculations were performed for the Li-graphene and Li$^+$-graphene systems in doublet and singlet spin states, respectively. The spin state for Mn-graphene was determined to be a sextet (S=5/2). Lower spin states were not energetically favorable.

For the calculations of LMO surfaces with a graphene patch (GP), the structural relaxations and electronic structure calculations were performed using the Perdew-Burke-Ernzerhof (PBE)[45,46] formulation of the generalized gradient approximation (GGA) with the projected augmented wave (PAW) method[47] as implemented in the Vienna ab initio simulation package (VASP).[48,49] The DFT+U functional introduced by Dudarev et al.[50] was used to perform GGA+U calculations with U=4.5 eV for Mn. The kinetic energy cutoff for the plane-wave basis was 520 eV. The Monkhorst-Pack[51] scheme with 3×3×3 k-point sets was used for the λ-$MnO_2$ and $LiMn_2O_4$ bulk calculations, and 3×3×1 k-point sets were used for the surface calculations. The tetrahedron method with Blöchl corrections[52] and denser k-point meshes were used for the calculation of the density of states (DOS). All calculations were spin-polarized, and anti-ferromagnetic order along the [110] directions were considered for LMO. The (001) LMO/GP super-cell slab was further modified to investigate the effect of the orientation of the GP on the structure stability and the DOS by varying the location of a graphene edge at various surface sites. For all the calculations, the edge carbon atoms of the GP were passivated by a hydrogen atom except the adsorbate site.[53,54]

REFERENCES

[1] M. Armand, J.-M. Tarascon, *Nature* 2008, 451, 652.
[2] J.-M. Tarascon, M. Armand, *Nature* 2001, 414, 359.
[3] J. Kim, A. Manthiram, *Nature* 1997, 390, 265.
[4] R. J. Gummow, D. C. Liles, M. M. Thackeray, *Mater. Res. Bull.* 1993, 28, 1249.
[5] M. M. Thackeray, P. J. Johnson, L. A. de Picciotto, *Mater. Res. Bull.* 1984, 19, 179.
[6] J. Cho, G. Kim, *Electrochem. Solid-State Lett.* 1999, 2, 253.
[7] C. Zhan, J. Lu, A. Jeremy Kropf, T. Wu, A. N. Jansen, Y.-K. Sun, X. Qiu, K. Amine, *Nat. Commun.* 2013, 4, 1.
[8] S. R. Gowda, K. G. Gallagher, J. R. Croy, M. Bettge, M. M. Thackeray, M. Balasubramanian, *Phys. Chem. Chem. Phys.* 2014, 16, 6898.
[9] R. J. Gummow, A. De Kock, M. M. Thackeray, *Solid State Ionics* 1994, 69, 59.
[10] M. Sathiya, G. Rousse, K. Ramesha, C. P. Laisa, H. Vezin, M. T. Sougrati, M.-L. Doublet, D. Foix, D. Gonbeau, W. Walker, a S. Prakash, M. Ben Hassine, L. Dupont, J.-M. Tarascon, *Nat. Mater.* 2013, 12, 827.
[11] S.-T. Myung, K.-S. Lee, D.-W. Kim, B. Scrosati, Y.-K. Sun, *Energy Environ. Sci.* 2011, 4, 935.
[12] B. J. Liddle, S. M. Collins, B. M. Bartlett, *Energy Environ. Sci.* 2010, 3, 1339.
[13] K. Mukai, Y. Kishida, H. Nozaki, K. Dohmae, *J. Power Sources* 2013, 224, 230.
[14] J. Bhattacharya, C. Wolverton, *J. Electrochem. Soc.* 2014, 161, A1440.
[15] D. Guan, J. a Jeevarajan, Y. Wang, *Nanoscale* 2011, 3, 1465.
[16] M. Thackeray, C. Johnson, J.-S. Kim, K. Lauzze, J. Vaughey, N. Dietz, D. Abraham, S. Hackney, W. Zeltner, M. Anderson, *Electrochem. commun.* 2003, 5, 752.
[17] Y. Bai, F. Wu, H. Yang, Y. Zhong, C. Wu, *Adv. Mater. Res.* 2012, 391-392, 1069.
[18] S. S. Roy, M. S. Arnold, *Adv. Funct. Mater.* 2013, 23, 3638.
[19] J. S. Bunch, S. S. Verbridge, J. S. Alden, A. M. Van Der Zande, J. M. Parpia, H. G. Craighead, P. L. Mceuen, *Nano Lett.* 2008, 8, 2458.
[20] L. Jaber-Ansari, K. P. Puntambekar, H. Tavassol, H. Yildirim, A. Kinaci, R. Kumar, S. J. Saldan, A. A. Gewirth, P. Greeley, M. K. Y. Chan, M. C. Hersam, *ACS Appl. Mater. Interfaces* 2014, 6, 17626.
[21] L. Luo, J. Wu, J. Luo, J. Huang, V. P. Dravid, *Sci. Rep.* 2014, 4, 4322.
[22] S. Chattopadhyay, A. L. Lipson, H. J. Karmel, J. D. Emery, T. T. Fister, P. A. Fenter, M. C. Hersam, M. J. Bedzyk, *Chem. Mater.* 2012, 24, 3038.

[23] H. Zhuo, S. Wan, C. He, Q. Zhang, C. Li, D. Gui, C. Zhu, H. Niu, J. Liu, *J. Power Sources* 2014, 247, 721.
[24] B. Lung-Hao Hu, F.-Y. Wu, C.-T. Lin, A. N. Khlobystov, L.-J. Li, *Nat. Commun.* 2013, 4, 1687.
[25] G. Kucinskis, G. Bajars, J. Kleperis, *J. Power Sources* 2013, 240, 66.
[26] H. K. Noh, H.-S. Park, H. Y. Jeong, S. U. Lee, H.-K. Song, *Angew. Chemie* 2014, 53, 5059.
[27] S. Komaba, N. Kumagai, M. Baba, F. Miura, N. Fujita, H. Groult, *J. Appl. Electrochem.* 2000, 30, 1179.
[28] J.-S. Kim, K. Kim, W. Cho, W. H. Shin, R. Kanno, J. W. Choi, *Nano Lett.* 2012, 12, 6358.
[29] M. Thackeray, *Prog. Solid State Chem.* 1997, 25, 1.
[30] P. Singh, A. Sil, M. Nath, S. Ray, *Phys. B Condens. Matter* 2010, 405, 649.
[31] X. Li, W. Cai, J. An, S. Kim, J. Nah, D. Yang, R. Piner, A. Velamakanni, I. Jung, E. Tutuc, S. K. Banerjee, L. Colombo, R. S. Ruoff, *Science* 2009, 324, 1312.
[32] J. W. Suk, A. Kitt, C. W. Magnuson, Y. Hao, S. Ahmed, J. An, A. K. Swan, B. B. Goldberg, R. S. Ruoff, *ACS Nano* 2011, 5, 6916.
[33] M. M. Thackeray, A. de Kock, D. C. Liles, D. Hoge, R. Bittihn, *J. Electrochem. Soc.* 1992, 139, 363.
[34] M. M. Thackeray, M. F. Mansuetto, J. B. Bates, *J. Power Sources* 1997, 68, 153.
[35] E. Regan, T. Groutso, J. B. Metson, R. Steiner, B. Ammundsen, D. Hassell, P. Pickering, *Surf Interface Anal.* 1999, 27, 1064.
[36] I. H. Cho, S.-S. Kim, S. C. Shin, N.-S. Choi, *Electrochem. Solid-State Lett.* 2010, 13, A168.
[37] R. Benedek, M. M. Thackeray, *Phys. Rev. B* 2011, 83, 195439.
[38] C. Y. Ouyang, S. Q. Shi, M. S. Lei, *J. Alloys Compd.* 2009, 474, 370.
[39] C. Y. Ouyang, X. M. Zeng, Z. Sljivancanin, A. Baldereschi, *J. Phys. Chem. C* 2010, 114, 4756.
[40] A. Karim, S. Fosse, K. Persson, *Phys. Rev. B* 2013, 87, 075322.
[41] J. Russell, P. Zapol, P. Král, L. a. Curtiss, *Chem. Phys. Lett.* 2012, 536, 9.
[42] M. J. Frisch, G. W. Trucks, H. B. Schlegel, G. E. Scuseria, M. A. Robb, J. R. Cheeseman, G. Scalmani, V. Barone, B. Mennucci, G. A. Petersson, H. Nakatsuji, M. Caricato, X. Li, H. P. Hratchian, A. F. Izmaylov, J. Bloino, G. Zheng, J. L. Sonnenberg, M. Hada, M. Ehara, K. Toyota, R. Fukuda, J. Hasegawa, M. Ishida, T. Nakajima, Y. Honda, O. Kitao, H. Nakai, T. Vreven, J. A. Montgomery Jr., J. E. Peralta, F. Ogliaro, M. Bearpark, J. J. Heyd, E. Brothers, K. N. Kudin, V. N. Staroverov, R. Kobayashi, J. Normand, K. Raghavachari, A. Rendell, J. C. Burant, S. S. Iyengar, J. Tomasi, M. Cossi, N. Rega, N. J. Millam, M. Klene, J. E. Knox, J. B. Cross, V. Bakken, C. Adamo, J. Jaramillo, R. Gomperts, R. E. Stratmann, O. Yazyev, A. J. Austin, R. Cammi, C. Pomelli, J. W. Ochterski, R. L. Martin, K. Morokuma, V. G. Zakrzewski, G. A. Voth, P. Salvador, J. J. Dannenberg, S. Dapprich, A. D. Daniels, O. Farkas, J. B. Foresman, J. V Ortiz, J. Cioslowski, D. J. Fox, 2009.
[43] A. D. Becke, *J. Chem. Phys.* 1993, 98.
[44] C. Lee, W. Yang, R. G. Parr, *Phys. Rev. B* 1988, 37, 785.
[45] J. P. Perdew, K. Burke, M. Ernzerhof, *Phys. Rev. Lett.* 1996, 77, 3865.
[46] J. P. Perdew, K. Burke, M. Ernzerhof, *Phys. Rev. Lett.* 1997, 78, 1396.
[47] G. Kresse, D. Joubert, *Phys. Rev. B* 1999, 59, 1758.
[48] G. Kresse, J. Hafner, *Phys. Rev. B* 1993, 47, 558.
[49] G. Kresse, J. Furthmiiller, *Comput. Mater. Sci.* 1996, 6, 15.
[50] S. L. Dudarev, G. A. Botton, S. Y. Savrasov, C. J. Humphreys, A. P. Sutton, *Phys. Rev. B* 1998, 57, 1505.
[51] H. J. Monkhorst, J. D. Pack, *Phys. Rev. B* 1976, 13, 5188.
[52] P. E. Blöchl, O. Jepsen, O. K. Andersen, *Phys. Rev. B* 1994, 49, 16223.
[53] Y. H. Lu, R. Q. Wu, L. Shen, M. Yang, Z. D. Sha, Y. Q. Cai, P. M. He, Y. P. Feng, *Appl. Phys. Lett.* 2009, 94, 122111.
[54] W. T. Geng, D. H. Ping, J. Nara, T. Ohno, *J. Phys. Chem. C* 2012, 116, 17650.
[55] A. C. Ferrari, D. M. Basko, *Nat. Nanotechnol.* 2013, 8, 235.
[56] R. Baddour-hadjean, J. Pereira-Ramos, *Chem. Rev.* 2010, 110, 1278.

All references, including publications, patent applications, and patents, cited herein are hereby incorporated by reference to the same extent as if each reference were individually and specifically indicated to be incorporated by reference and were set forth in its entirety herein.

What is claimed:

1. A cathode comprising:
   a metal oxide spinel film comprising $LiM_xMn_{2-x}O_4$, and
   a graphene film, the graphene film disposed on a surface of the metal oxide film,
   wherein M is selected from a group comprising Li, Co, Ni, Al, Y, Ti, and Zn and X is any real number greater than or equal to zero and less than or equal to two and
   wherein the cathode is configured to form a solid electrolyte interphase layer disposed on the graphene film when the cathode is contacted with an electrolyte and wherein the graphene film comprises a substantially monolayer graphene film.

2. The cathode of claim 1, wherein the metal oxide spinel comprises $LiMn_2O_4$.

3. The cathode of claim 1, wherein the metal oxide spinel further comprises Co, Ni, Al, Y, Ti, or Zn.

4. The cathode of claim 1, wherein M is selected from a group comprising Li, Co, Ni, and Zn.

5. The cathode of claim 1, wherein the metal oxide spinel film has a thickness greater than or equal to 100 nm and less than or equal to 150 nm.

6. The cathode of claim 1, wherein the graphene film comprises less than or equal to 20% double-layer graphene islands.

7. The cathode of claim 1, wherein the graphene film is substantially free of vacancy defects.

8. The cathode of claim 1, wherein the metal oxide spinel film comprises a plurality of manganese atoms having a bulk oxidation state and a plurality of manganese atoms having a surface oxidation state, wherein the surface oxidation state is greater than the bulk oxidation state.

9. The cathode of claim 8, wherein the bulk oxidation state is +3.

10. The cathode of claim 8, wherein the surface oxidation state is greater than +3.

11. The cathode of claim 8, wherein the surface oxidation state is +4.

12. The cathode of claim 1, wherein the cathode further comprises the solid electrolyte interphase layer disposed on the graphene film and wherein the solid electrolyte interphase layer comprises lithium carbonate.

13. The cathode of claim 12, wherein the solid electrolyte interphase film has a thickness of less than or equal to 100 nm.

14. An electrochemical cell comprising the cathode of claim 1, an anode, and an electrolyte.

15. The electrochemical cell of claim 14, wherein the anode comprises lithium or graphite.

16. The electrochemical cell of claim 14, wherein the electrolyte comprises a lithium salt and an organic carbonate solvent.

17. The electrochemical cell of claim 14, wherein the electrolyte comprises 1 M $LiClO_4$ in a solution of 1:1 ethylene carbonate:dimethyl carbonate.

18. The electrochemical cell of claim 14, wherein the cathode further comprises the solid electrolyte interphase layer disposed on the graphene film and wherein the solid electrolyte interphase layer comprises lithium carbonate.

19. The electrochemical cell of claim 18, wherein the solid electrolyte interphase film has a thickness of less than or equal to 100 nm.

20. A method for preparing a cathode, the method comprising:
   (a) obtaining the metal oxide spinel film of claim 1;
   (b) obtaining a graphene film; and
   (c) transferring the graphene film onto a surface of the metal oxide spinel film.

\* \* \* \* \*